United States Patent
Uemura et al.

(10) Patent No.: US 9,883,467 B2
(45) Date of Patent: Jan. 30, 2018

(54) TERMINAL DEVICE, BASE STATION DEVICE, COMMUNICATION SYSTEM, CONTROL METHOD, AND INTEGRATED CIRCUIT

(71) Applicant: Sharp Kabushiki Kaisha, Sakai, Osaka (JP)

(72) Inventors: Katsunari Uemura, Sakai (JP); Yasuyuki Kato, Sakai (JP); Hidekazu Tsuboi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/123,267

(22) PCT Filed: Mar. 5, 2015

(86) PCT No.: PCT/JP2015/056532
§ 371 (c)(1),
(2) Date: Sep. 2, 2016

(87) PCT Pub. No.: WO2015/133579
PCT Pub. Date: Sep. 11, 2015

(65) Prior Publication Data
US 2017/0078984 A1    Mar. 16, 2017

(30) Foreign Application Priority Data

Mar. 6, 2014 (JP) ................................ 2014-043684

(51) Int. Cl.
*H04B 1/00* (2006.01)
*H04B 17/00* (2015.01)
(Continued)

(52) U.S. Cl.
CPC ......... *H04W 52/365* (2013.01); *H04W 52/34* (2013.01); *H04W 72/0413* (2013.01)

(58) Field of Classification Search
CPC .................................................. H04W 52/365
(Continued)

(56) References Cited

U.S. PATENT DOCUMENTS

| 2012/0044882 A1* | 2/2012 | Kim ...................... H04L 5/0058 370/329 |
| 2012/0087317 A1* | 4/2012 | Bostrom ............... H04W 52/30 370/329 |

(Continued)

OTHER PUBLICATIONS

3GPP TSG-RAN WG2 #81 Jan. 28-Feb. 1, 2013 St. Julian's Malta NTT Docomo, Inc. Deplyment scenarios and design goals for dual connectivity.*

(Continued)

*Primary Examiner* — Tilahun B Gesesse
(74) *Attorney, Agent, or Firm* — Keating & Bennett, LLP

(57) ABSTRACT

In a terminal device that uses a plurality of cells, the plurality of cells are grouped into a cell group for a first base station device and a cell group for a second base station device, and processing for activation/deactivation of the plurality of cells is performed on a cell in the cell group that receive a control element indicating the activation/deactivation, and in a case where the cell group for the second base station is added, a power headroom indicating capacity available for transmit power in the plurality of cells is determined as being triggered, and power headrooms of the plurality of cells that are activated are reported.

8 Claims, 10 Drawing Sheets

(51) Int. Cl.
*H04B 7/00* (2006.01)
*H04W 52/36* (2009.01)
*H04W 52/34* (2009.01)
*H04W 72/04* (2009.01)

(58) Field of Classification Search
USPC .............................. 455/522, 69, 63.1, 67.13
See application file for complete search history.

(56) References Cited

U.S. PATENT DOCUMENTS

| | | | | |
|---|---|---|---|---|
| 2012/0182960 A1* | 7/2012 | Wang | ................... | H04W 52/365 |
| | | | | 370/329 |
| 2012/0294167 A1* | 11/2012 | Zhu | ................... | H04W 52/146 |
| | | | | 370/252 |
| 2012/0294264 A1* | 11/2012 | Valluri | ................... | H04W 8/26 |
| | | | | 370/329 |
| 2012/0294267 A1* | 11/2012 | Wang | ................... | H04W 52/365 |
| | | | | 370/329 |
| 2013/0064131 A1* | 3/2013 | Kwon | ................... | H04L 5/0007 |
| | | | | 370/252 |
| 2013/0188570 A1* | 7/2013 | Zhao | ................... | H04L 5/0007 |
| | | | | 370/329 |
| 2013/0215866 A1* | 8/2013 | Ahn | ................... | H04W 52/04 |
| | | | | 370/329 |
| 2013/0336228 A1* | 12/2013 | Zhao | ................... | H04W 24/10 |
| | | | | 370/328 |
| 2014/0029586 A1* | 1/2014 | Loehr | ................... | H04W 56/0005 |
| | | | | 370/336 |
| 2014/0056243 A1 | 2/2014 | Pelletier et al. | | |
| 2015/0358920 A1* | 12/2015 | Sorrentino | ................... | H04W 52/146 |
| | | | | 455/522 |

OTHER PUBLICATIONS

NTT Docomo, Inc., "Deployment scenarios and design goals for dual connectivity", 3GPP TSG-RAN WG2 #81, R2-130444, Jan. 28-Feb. 1, 2013, pp. 1-6.
MediaTek Inc., "Control Plane Architecture", 3GPP TSG-RAN2 #82 Meeting, R2-131778, May 20-24, 2013, pp. 1-3.

* cited by examiner

FIG. 4

|     |                              | CELL INDEX |
|-----|------------------------------|------------|
| MCG | PRIMARY CELL                 | 0          |
| MCG | SECONDARY CELL #1            | 1          |
| MCG | SECONDARY CELL #2            | 2          |
| SCG | SECONDARY CELL #3 (PRIMARY)  | 3          |
| SCG | SECONDARY CELL #4            | 4          |

FIG. 6

| C(7) | C(6) | C(5) | C(4) | C(3) | C(2) | C(1) | R | Octet 1 |
|---|---|---|---|---|---|---|---|---|
| PRIMARY CELL Type2 PH ||||||||  |
| PRIMARY CELL Type1 PH ||||||||  |
| PRIMARY SECONDARY CELL Type2 PH ||||||||  |
| PRIMARY SECONDARY CELL Type1 PH ||||||||  |
| SECONDARY CELL (#1 TO #n) Type1 PH ||||||||  |

FIG. 8

|  | | CELL INDEX |
|---|---|---|
| MCG | PRIMARY CELL | 0 |
| | SECONDARY CELL #1 | 1 |
| | SECONDARY CELL #2 | 2 |
| SCG | SECONDARY CELL #3 (PRIMARY) | 1 |
| | SECONDARY CELL #4 | 2 |

FIG. 9

| C(7) | C(6) | C(5) | C(4) | C(3) | C(2) | C(1) | R | Octet 1 |
|---|---|---|---|---|---|---|---|---|
| PRIMARY SECONDARY CELL Type2 PH | | | | | | | | |
| PRIMARY SECONDARY CELL Type1 PH | | | | | | | | |
| SECONDARY CELL (#1 TO #n) Type1 PH (SCG) | | | | | | | | |

TERMINAL DEVICE, BASE STATION DEVICE, COMMUNICATION SYSTEM, CONTROL METHOD, AND INTEGRATED CIRCUIT

TECHNICAL FIELD

Embodiments of the present invention relate to a technology associated with a terminal device, a base station device, a communication system, a control method, and an integrated circuit, in all of which a plurality of cells are efficiently controlled.

This application claims the benefit of Japanese Priority Patent Application No. 2014-043684 filed on Mar. 6, 2014, the entire contents of which are incorporated herein by reference.

BACKGROUND ART

In 3rd Generation Partnership Project (3GPP) that is a standardization project, a standardization process for Evolved Universal Terrestrial Radio Access (which is hereinafter referred to as EUTRA) that realizes high-speed communication has been performed by employing flexible scheduling in prescribed frequency or time units, which is referred to as an Orthogonal Frequency-Division Multiplexing (OFDM) communication scheme or a resource block.

Furthermore, in 3GPP, a study on Advanced EUTRA (which is also referred to as LTE Advanced) that realizes higher-speed data transfer has been conducted. In EUTRA, a communication system is available on the assumption of a network in which base station devices have almost the same cell constitution (cell size). However, in Advanced EUTRA, a study on the communication system has been conducted on the assumption of a network (heterogeneous wireless network or Heterogeneous Network) in which the base station devices (the cells) having different constitutions are present in a mixed manner in the same area.

A study has been conducted on a technology (Dual Connectivity) in which, like in the heterogeneous network, in the communication system in which a cell (macro cell) having a greater radius and a cell (small cell) having a smaller radius than the macro cell are arranged, a terminal device makes a connection to the macro cell and the small cell at the same time and thus performs communication (NPL 1).

In NPL 1, a study has been conducted on a network in which it is assumed that, when the terminal device makes an attempt to realize the dual connectivity between the cell (macro cell) having a large radius (cell size) and the cell (small cell) having a small radius, low speed is caused and a delay occurs in a backhaul line between the macro cell and the small cell. That is, there is likelihood that delay in control information or user information that is given or taken between the macro cell and the small cell will make it difficult or hard to realize a function that is possible with the dual connectivity in the related art.

For example, in the related art, one base station device intensively performs control for packet scheduling of a plurality of cells, but in the network in which the delay occurs in the backhaul line, there is likelihood that this intensive performance of the control will make it difficult to perform optimal scheduling that reflects a wireless situation. For this reason, a study has been conducted on a method in which both sides, the base station device that constitutes the macro cell and the base station device that constitutes the small cell are made to be equipped with a dynamic resource allocation function and thus packet scheduling is controlled in a distributed manner (NPL 2).

CITATION LIST

Non-Patent Literature

NPL 1: R2-130444 and NTT. DOCOMO, INC., 3GPP TSG-RAN2#81, St. Julian's, Malta, Jan. 28-Feb. 1, 2013. http://www.3gpp.org/ftp/tsg_ran/WG2_RL2/TSGR2_81/Docs/

NPL 2: R2-131778, MediaTek Inc., 3GPP TSG RAN2#82, Fukuoka, Japan, May 20th-24th, 2013. http://www.3gpp.org/ftp/tsg_ran/WG2_RL2/TSGR2_82/Docs

DISCLOSURE OF THE INVENTION

Problems to be Solved by the Invention

Like in an example of NPL 2, distributed packet scheduling is performed between the base station devices, and thus the terminal device can transmit feedback information directly to the base station device without involving the backhaul line between the base station devices. However, the base station device performs the distributed packet scheduling, and thus there is likelihood that one base station device will not know in real time a state of a cell that is managed by the another base station device.

For example, this means that the following problems occur.

(1) When it comes to an identifier (a cell index) of a cell that is notified to the terminal device, there is likelihood that the same identifier will be configured for different cells.

(2) In relation to (1), in a case where the same identifier is configured for different cells, the terminal device does not correctly perform a report relating to a cell that uses the identifier.

(3) In relation to (1), a study is not conducted on a mechanism which guarantees that the same identifier is not configured for different cells.

(4) In relation to (3), a study is not conducted on control relating to a cell that uses an identifier for the terminal device in a case where it is guaranteed that the same identifier is not configured for different cells.

An object of embodiments of the present invention is to deal with at least one of the problems described above by providing a technology associated with a terminal device, a base station device, a communication system, a control method, and an integrated circuit, in all of which it is possible that a plurality of cells are efficiently controlled.

Means for Solving the Problems

In order to accomplish the object described above, the following means are contrived. That is, according to an embodiment of the present invention, there is provided a terminal device that uses a plurality of cells, in which the plurality of cells are grouped into a cell group for a first base station device including a primary cell and a cell group for a second base station device including a primary secondary cell, and in which, in a case where the primary secondary cell is added, a power headroom report is determined as being triggered, a MAC control element including power headrooms of at least the primary cell and the primary secondary cell is generated, and the MAC control element is transmitted.

Furthermore, in the terminal device according to the embodiment of the present invention, different types of power headrooms that are reported in a case where a Physical Uplink Control Channel and a Physical Uplink Shared Channel are transmitted on the same subframe may be calculated for the primary cell and the primary secondary cell, respectively, and the different types of the power headrooms may be transmitted in a state of being included in the MAC control element.

By using this means, the terminal device can efficiently control the plurality of cells.

Furthermore, in the terminal device according to the embodiment of the present invention, cell indexes that correspond to the primary secondary cell and the secondary cell that reports the power headroom, respectively, may be individually configured with an RRC message, and in order to indicate a cell that reports the power headroom, a specific value may be configured for a bit for bitmap information that corresponds to the cell indexes.

Furthermore, according to another embodiment of the present invention, there is provided a base station device that communicates with a terminal device which uses a plurality of cells, in which information on a cell index that is allocated to a cell in each of a cell group for a first base station device that includes a primary cell, and a cell group for a second base station device that includes a primary secondary cell is individually notified to the terminal device with an RRC message, and in which a power headroom report that is triggered by the terminal device in a case where the primary secondary cell is added is received, and, based on bitmap information that corresponds to the cell index which is included in the power headroom report, power headrooms of the primary secondary cell and a secondary cell that reports a power headroom are received.

By using this means, the base station device can efficiently control the plurality of cells.

Furthermore, according to still another embodiment of the present invention, there is provided a communication system including: a terminal device that uses a plurality of cells; and a base station device that communicates with the terminal device, in which the base station device individually notifies the terminal device of information on a cell index that is allocated to a cell in each of a cell group for a first base station device that includes a primary cell, and a cell group for a second base station device that includes a primary secondary cell, with an RRC message, and in which the terminal device groups the plurality of cells into the cell group for the first base station device and the cell group for the second base station device, based on the RRC message, and in a case where the primary secondary cell is added, determines that a power headroom report is triggered, generates a MAC control element including power headrooms of at least the primary cell and the primary secondary cell, and transmits the MAC control element.

By using this means, in the communication system that is constituted from the terminal device and the base station device, the terminal device and the base station device that efficiently control the plurality of cells can be provided.

Furthermore, according to still another embodiment of the present invention, there is provided a control method for use in a terminal device that uses a plurality of cells, the control method at least including: a step of grouping the plurality of cells into a cell group for a first base station device including a primary cell and a cell group for a second base station device including a primary secondary cell; a step of determining that in a case where the primary secondary cell is added, a power headroom report is triggered; and a step of generating a MAC control element including power headrooms of at least the primary cell and the primary secondary cell and transmitting the MAC control element.

By using this means, the control method of efficiently controlling the plurality of cells can be used in the terminal device.

Furthermore, the control method according to the embodiment of the present invention may further include: a step of calculating different types of power headrooms that are reported in a case where a Physical Uplink Control Channel and a Physical Uplink Shared Channel are transmitted on the same subframe, for the primary cell and the primary secondary cell, respectively; and a step of transmitting the different types of the power headrooms in a state of being included in the MAC control element.

Furthermore, the control method according to the embodiment of the present invention may further include a step of individually configuring cell indexes that correspond to the primary secondary cell and the secondary cell that reports the power headroom, respectively, with an RRC message, and of configuring a specific value for a bit for bitmap information that corresponds to the cell indexes, in order to indicate a cell that reports the power headroom.

Furthermore, according to still another embodiment of the present invention, there is provided a control method for use in a base station device that communicates with a terminal device which uses a plurality of cells, the control method at least including: a step of individually notifying the terminal device of information on a cell index that is allocated to a cell in each of a cell group for a first base station device that includes a primary cell, and a cell group for a second base station device that includes a primary secondary cell, with an RRC message; a step of receiving a power headroom report that is triggered by the terminal device in a case where the primary secondary cell is added; and a step of receiving power headrooms of the primary secondary cell and a secondary cell that report a power headroom, based on bitmap information that corresponds to the cell index which is included in the received power headroom report.

By using this means, the control method of efficiently controlling the plurality of cells can be used in the base station device.

Furthermore, according to still another embodiment of the present invention, there is provided an integrated circuit that is built into a terminal device which uses a plurality of cells, the integrated circuit causing at least the terminal device to perform: a function of grouping the plurality of cells into a cell group for a first base station device including a primary cell and a cell group for a second base station device including a primary secondary cell; a function of determining that in a case where the primary secondary cell is added, a power headroom report is triggered; and a function of generating a MAC control element including power headrooms of at least the primary cell and the primary secondary cell and transmitting the MAC control element.

By using this means, the integrated circuit of the terminal device can cause the terminal device to perform the function of efficiently controlling the plurality of cells.

Furthermore, according to still another embodiment of the present invention, there is provided an integrated circuit that is built into a base station device that communicates with a terminal device which uses a plurality of cells, the integrated circuit causing at least the base station device to perform: a function of individually notifying the terminal device of information on a cell index that is allocated to a cell in each of a cell group for a first base station device that includes a primary cell, and a cell group for a second base station device that includes a primary secondary cell, with an RRC message; a function of receiving a power headroom report that is triggered by the terminal device in a case where the primary secondary cell is added; and a function of receiving power headrooms of the primary secondary cell and a secondary cell that reports a power headroom, based on bitmap information that corresponds to the cell index which is included in the power headroom report.

By using this means, the integrated circuit of the base station device can cause the base station device to perform the function of efficiently controlling the plurality of cells.

In the present specification, each embodiment is disclosed in terms of the technology relating to the terminal device, the base station device, the communication system, the control method, and the integrated circuit, in all of which the plurality of cells are efficiently controlled, but a communication scheme that is applicable to each embodiment is not limited to a communication scheme that is compatible with EUTRA or EUTRA like Advanced EUTRA.

For example, the technology that is described in the present specification can be used in various communication systems, such as Code Division Multiple Access (CDMA), Time Division Multiple Access (TDMA), Frequency Division Multiplexing Access (FDMA), orthogonal FDMA (OFDMA), single career FDMA (SC-FDMA), and other access schemes. Furthermore, in the present specification, the system and the network can be used synonymously.

Effects of the Invention

According to embodiments of the present invention, a technology associated with a terminal device, a base station device, a communication system, a control method, and an integrated circuit, in all of which a plurality of cells are efficiently controlled, can be provided.

BRIEF DESCRIPTION OF THE DRAWINGS

FIG. 4 is a diagram illustrating one example of allocation of a cell index according to the first embodiment of the present invention.

FIG. 6 is a diagram for describing one example of a report type of the Power Headroom according to the first embodiment of the present invention.

FIG. 8 is a diagram illustrating one example of allocation of a cell index according to a second embodiment of the present invention.

FIG. 9 is a diagram for describing one example of a report type of a Power Headroom according to the second embodiment of the present invention.

MODE FOR CARRYING OUT THE INVENTION

Figure 1:
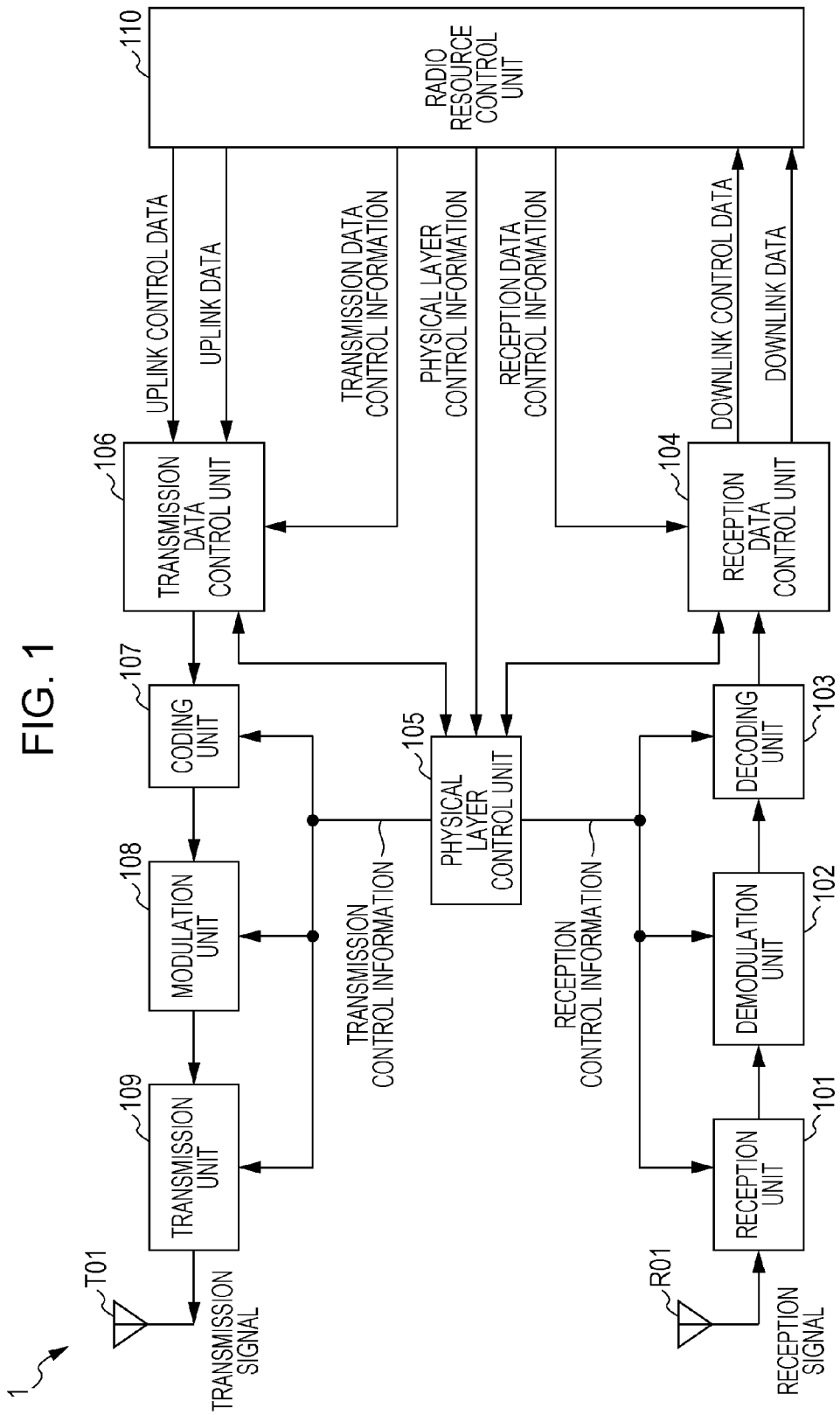
FIG. 1 is a block diagram illustrating one example of a schematic constitution of a terminal device according to an embodiment of the present invention.

A technology relating to each embodiment of the present invention will be described briefly below.

[Physical Channel/Physical Signal]

Main physical channels and physical signals that are used in EUTRA and Advanced EUTRA are described. A channel means a medium that is used for signal transmission and reception, and a physical channel means a physical medium that is used for the signal transmission and reception. According to the present invention, the physical channel and the signal can be used synonymously. There is likelihood that in EUTRA and Advanced EUTRA, the physical channel will be added in future or an architecture or format type thereof will be changed or added, but this change or addition does not have any influence on a description of each embodiment of the present invention.

In EUTRA and Advanced EUTRA, scheduling of the physical channel or the physical signal is managed using a radio frame. One radio frame is 10 ms, and one radio frame is constituted from 10 subframes. In addition, one subframe is constituted from two slots (that is, one subframe is 1 ms and one slot is 0.5 ms). Furthermore, management is performed using a resource block as a minimum unit for scheduling for allocating the physical channel. The resource block is defined by a fixed frequency domain that is constituted from a set of multiple subcarriers (for example, 12 subcarriers) along a frequency axis and by a domain that is constituted from a fixed transmission time interval (1 slot).

A synchronization signal is constituted from 3 types of primary synchronization signals and a secondary synchronization signal that is constituted from 31 types of codes which are alternately arranged in the frequency domain. With a combination of these signals, the primary synchronization signal and the secondary synchronization signal, 504 cell identifiers (physical cell ID (Physical Cell Identity (PCI))) for identifying a base station device and a frame timing for wireless synchronization are indicated. A terminal device specifies the physical cell ID of the synchronization signal that is received through cell search.

A Physical Broadcast Channel (PBCH) is transmitted for the purpose of notifying (configuring) a control parameter (broadcast information (system information)) that is used in a shared manner in terminal devices within a cell. When it comes to the broadcast information that is not notified on the Physical Broadcast Channel, a radio resource with which the broadcast information is transmitted on a Physical Downlink Control Channel is notified to the terminal device within the cell, and with the notified radio resource, a layer 3 message (system information) that notifies the broadcast information using a Physical Downlink Shared Channel is transmitted.

As pieces of broadcast information, a Cell Global Identifier (CGI) indicating a cell-dedicated identifier, a Tracking Area Identifier (TAI) for managing a waiting area by paging, random access configuration information, transmission timing adjustment information, shared radio resource configuration information in the cell, neighboring cell information, uplink access limitation information, and the like are notified.

Downlink reference signals are categorized by their usage into multiple types. For example, a cell-specific reference signal (RS) is a pilot signal that is transmitted with a prescribed power for every cell, and is a downlink reference signal that is periodically iterated in the frequency domain and the time domain based on a prescribed rule. The terminal device measures reception quality for every cell by receiving the cell-specific RS. Furthermore, the terminal device uses the cell-specific RS also as a reference signal for demodulation of the Physical Downlink Control Channel that is transmitted at the same time as the cell-specific reference signal, or of the Physical Downlink Shared Channel. As a sequence that is used for the cell-specific RS, a sequence that is identifiable for every cell is used.

Furthermore, the downlink reference signal is also used for estimation of propagation fluctuation in downlink. The downlink reference signal that is used for the estimation of the propagation fluctuation is referred to as a Channel State Information Reference Signal (CSI-RS). Furthermore, the downlink reference signal that is configured, in a dedicated manner, for the terminal device is referred to as UE-specific Reference Signals (URS), Demodulation Reference Signal (DMRS), or Dedicated RS (DRS), and is referred to for channel compensation processing of the channel that is to be performed when demodulating the Physical Downlink Control Channel, Enhanced Physical Downlink Control Channel, or the Physical Downlink Shared Channel.

The Physical Downlink Control Channel (PDCCH) is transmitted in several OFDM symbols (for example, 1 to 4 OFDM symbols) starting from the head of each subframe. The Enhanced Physical Downlink Control Channel (EPDCCH) is a Physical Downlink Control Channel that is allocated to the OFDM symbols to which the Physical Downlink Shared Channel (PDSCH) is allocated. The PDCCH or the EPDCCH is used for the purpose of notifying radio resource allocation information in accordance with the scheduling by the base station device for the terminal device, or information indicating an amount of adjustment for an increase or decrease in transmit power. Unless otherwise specified, the Physical Downlink Control Channel (PDCCH) that will be described simply below means both of the physical channels, the PDCCH and the EPDCCH.

The terminal device monitors the Physical Downlink Control Channel that is destined for the terminal device itself before transmitting and receiving a layer 2 message and the layer 3 message (paging, a handover command, or the like) that are downlink data or downlink control data, and receives the Physical Downlink Control Channel that is destined for the terminal device itself. Thus, the terminal device needs to acquire from the Physical Downlink Control Channel the radio resource allocation information that is referred to as an uplink grant at the time of the transmission and as a downlink grant (a downlink assignment) at the time of the reception. Moreover, in addition to being transmitted in the OFDM symbol described above, it is possible that the Physical Downlink Control Channel is also constituted to be transmitted in a region of the resource block that is allocated in a dedicated manner from the base station device to the terminal device.

A Physical Uplink Control Channel (PUCCH) is used for an acknowledgement response (Acknowledgement/Negative Acknowledgement (ACK/NACK)) for reception of the downlink data that is transmitted on the Physical Downlink Shared Channel, for downlink channel (channel state) information (Channel State Information (CSI)), or for making an uplink radio resource allocation request (a radio resource request or a Scheduling Request (SR)).

Pieces of CSI include a Channel Quantity Indicator (CQI), a Precoding Matrix Indicator (PMI), a Precoding Type Indicator (PTI), and a Rank Indicator (RI). Each indicator may be expressed as indication.

The Physical Downlink Shared Channel (PDSCH) is also used for notifying the terminal device of the broadcast information (system information) that is not notified, as the layer 3 message, by paging or on the Physical Broadcast Channel, as well as the downlink data. The radio resource allocation information of the Physical Downlink Shared Channel is indicated with the Physical Downlink Control Channel. The Physical Downlink Shared Channel is transmitted in a state of being allocated to OFDM symbols other than the OFDM symbols in which the Physical Downlink Control Channel is transmitted. That is, the Physical Downlink Shared Channel and the Physical Downlink Control Channel are time-multiplexed within one subframe.

It is possible that uplink data and uplink control data are mainly transmitted on a Physical Uplink Shared Channel (PUSCH), and the PUSCH includes control data, such as the CSI or the ACK/NACK. Furthermore, the PUSCH is also used for the terminal device to notify the base station device of uplink control information as the layer 2 message and the layer 3 message, in addition to the uplink data. Furthermore, as is the case in the downlink, the radio resource allocation information of the Physical Uplink Shared Channel is indicated with the Physical Downlink Control Channel.

Included in an Uplink Reference Signal (which is also referred to as an uplink pilot signal or an uplink pilot channel) are a Demodulation Reference Signal (DMRS) that is used for the base station device to demodulate the Physical Uplink Control Channel (PUCCH) and/or the Physical Uplink Shared Channel (PUSCH) and a Sounding Reference Signal (SRS) that is used for the base station device to mainly estimate an uplink channel state. Furthermore, as the Sounding Reference Signals, there are a periodic Sounding Reference Signal (Periodic SRS) that is periodically transmitted and an aperiodic Sounding Reference Signal (Aperiodic SRS) that is transmitted when there is an instruction to transmit the Aperiodic SRS from the base station device.

A Physical Random Access Channel (PRACH) is a channel that is used for notifying (configuring) a preamble sequence and has a guard time. The preamble sequence is constituted in such a manner that information is notified to the base station device with multiple sequences. For example, in a case where 64 types of sequences are prepared, 6-bit information can be indicated to the base station device. The Physical Random Access Channel is used as means by which the terminal device has access to the base station device.

The terminal device uses the Physical Random Access Channel in order to make the radio resource request in uplink when the Physical Uplink Control Channel is not configured, to make a request to the base station device for the transmission timing adjustment information (which is also referred to as timing advance (TA)) indispensable for adjusting an uplink transmission timing to a reception timing window of the base station device, or to perform an operation like this. Furthermore, the base station device can also make a request to the terminal device for starting of a random access procedure using the Physical Downlink Control Channel.

The layer 3 message is a message that is handled with a protocol of a control-plane (C-Plane) (CP) that is exchanged in radio resource control (RRC) layers of the terminal device and the base station device. The layer 3 message and RRC signaling or an RRC message can be used synonymously. Moreover, in contrast with the control-plane, a plane for a protocol that is used to handle user data is referred to as a user-plane (U-Plane) (UP).

Moreover, detailed descriptions of physical channels or physical signals other than these are omitted because they have no relationship with each embodiment of the present invention. As physical channels or physical signals of which the descriptions are omitted, there are a physical Control format indicator channel (PCFICH), a physical hybrid ARQ indicator channel (PHICH), a physical multicast channel (PMCH) and the like.

[Wireless Network]

A range (a communication area) in which each frequency is available for communication, which is controlled by the base station device, is regarded as a cell. At this time, the communication area that is covered by the base station device may vary in size and shape from one frequency to another. Furthermore, the area that is covered may vary from one frequency to another. When cells that are covered by different types of base station devices or that have different radii are present in a mixed manner in an area where the same frequency or different frequencies are available and one communication system is formed, this wireless network is referred to as a heterogeneous network.

The terminal device regards the inside of the cell as the communication area, and as such operates. When the terminal device moves from a serving cell to a different cell, the terminal device moves to a separate suitable cell by a cell re-selection procedure at the time of a non-wireless connection (during non-communication) and by a handover procedure at the time of a wireless connection (during communication). The suitable cell indicates a cell in which it is determined that, generally, the access by the terminal device is not disallowed based on information that is designated from the base station device, and in which the reception quality of the downlink satisfies a prescribed condition.

The base station device manages a certain cell that is an area where it is possible that the terminal device performs communication, from one frequency to another. One base station device may manage a plurality of cells. Cells are categorized into multiple types according to the size (cell size) of an area where communication with the terminal device is possible. For example, cells are categorized into macro cells and small cells. Generally, the small cell is a cell that has a coverage area with a radius of several meters to several-ten meters. Furthermore, the small cells are categorized into femto cells, pico cells, nano cells, and the like according to their coverage areas.

When it is possible that the terminal device communicates with a certain base station device, among cells that are covered by the certain base station, a cell on which the terminal device camps and that is configured in such a manner that the cell is used for communication is referred to as a serving cell, and the other cells that are not used for the communication are referred to as neighboring cells.

[Primary Cell and a Secondary Cell]

Furthermore, a technology in which frequencies (component carriers or frequency bands) in multiple different frequency bands are aggregated by carrier aggregation and are handled as if they were one frequency (frequency band) may be applied to the terminal device and the base station device. In the carrier aggregation, as the component carriers, there are an uplink component carrier that corresponds to the uplink and a downlink component carrier that corresponds to the downlink. In the present specification, the frequency and the frequency band can be used synonymously.

For example, in a case where a frequency bandwidth is obtained by aggregating five 20 MHz component carriers, the terminal device that has the capability for the carrier aggregation performs transmission and reception, regarding these as a 100 MHz frequency bandwidth. Moreover, although the component carries to be aggregated are contiguous frequencies, some or all of the component carriers may be non-contiguous frequencies. For example, available frequency bands are a 800 MHz band, 2 GHz band, and a 3.5 GHz band, one component carrier may be transmitted in the 800 MHz band, another component in the 2 GHz band, and a third component in the 3.5 GHz band.

Furthermore, it is possible that the terminal device and the base station device also aggregate multiple contiguous or non-contiguous component carriers in the same frequency band. A frequency bandwidth of each component carrier may be a frequency bandwidth (for example, 5 MHz or 10 MHz) narrower than a frequency bandwidth (for example, 20 MHz) in which the terminal device is capable of performing reception, and the frequency bandwidths to be aggregated may be different from each other. It is desirable that a frequency bandwidth is equal to any one of the frequency bandwidths in a cell in the related art, considering backward compatibility, but a frequency bandwidth may be used that is different from the frequency bandwidth in the cell in the related art.

With the carrier aggregation, component carriers (career types) may be aggregated that do not have the backward compatibility. The component carrier that does not have the backward compatibility is also referred to as a new component type (NCT). Moreover, it is desirable that the number of uplink component carriers that are allocated to (configured for or added to) the terminal device by the base station device is equal to or smaller than the number of downlink component carriers.

The terminal device and the base station device manage as a primary cell (PCell) a cell that is constituted from a certain uplink component carrier and a downlink component carrier which is connected, in a cell-specific manner, to the certain uplink component carrier. Furthermore, the terminal device and the base station device manage as a secondary cell (SCell) a cell that is constituted from component carriers other than those from which the primary cell are constituted.

The terminal device may perform reception of a paging message, detection of update of the broadcast information, an initial access procedure, configuration of security information, and the like in the primary cell, and on the other hand, may not perform these operations in the secondary cell. The primary cell and the secondary cell are collectively referred to as a serving cell.

The primary cell is other than a target for control of activation and deactivation (more precisely, the primary cell is regarded as being necessarily activated), but the secondary cell retains a state of the cell, in accordance with activities, that is, the activation and the deactivation. With regard to the state of the cell, a state where the serving cell is activated is also referred to as an activated state, and a state where the serving cell is deactivated is also referred to as a deactivated state. When it comes to the state of the cell (the secondary cell), there are also a case where a change of the state is explicitly designated (notified or indicated) by the base station device, and a case where the state is changed based on timer information (a secondary cell deactivation timer (a deactivation timer)) that is counted by the terminal device for every component carrier (secondary cell).

The control relating to the activation and/or deactivation of the secondary cell is described. The base station device notifies the terminal device of a command indicating the activation and/or deactivation of the secondary cell. The command is transmitted, as a MAC control element (MAC-CE) that is included in a MAC protocol data unit (PDU) which is decoded (encoded) with the MAC layer, to the terminal device.

Figure 11:
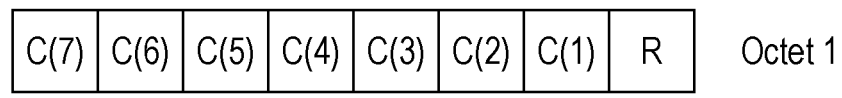
FIG. 11 is a diagram illustrating one example of a format of a control element that is used for control of activation/deactivation of a secondary cell in the related art.

The terminal device receives a one-octet sequence of bits (8 bits) that is notified in a format (bit architecture (constitution)) which is illustrated in FIG. 11, as the MAC control element (activation/deactivation MAC control element) indicating the activation and/or deactivation of the secondary cell. Field "R" in the drawings is a reserved bit, and is 0 (zero). Moreover, FIG. 11 may be interpreted as a command indicating a state of the secondary cell that is attained after the terminal device performs the activation and/or deactivation.

Furthermore, field "C(i)" is bitmap information that individually expresses information indicating that the state of the secondary cell has to be changed to the activation and/or deactivation. i(i=1 to 7) is a number indicating an identifier (a cell index) of the secondary cell, and is notified by the base station device to the terminal device when configuring (allocating) the secondary cell. In a case where field "C(i)" is "1", the terminal device is assumed to be in a state of activating the secondary cell that corresponds to index i. On the other hand, in a case where field "C(i)" is "0 (zero)", the terminal device is assumed to be in a state of deactivating the secondary cell that corresponding to index i. In a case where the secondary cell that corresponds to index i is not configured for the terminal device, the terminal device disregards a value that is index i.

With regard to a field C(i), in a case where the activation (that is, 1) is configured for the secondary cell that is activated, and in a case where the deactivation (that is, 0 (zero)) is configured for the secondary cell that is deactivated, the terminal device does not a state of the corresponding cell (maintains the state).

Moreover, the carrier aggregation is for communication in a plurality of cells that uses multiple component carriers (frequency bands), and is also referred to as cell aggregation. Moreover, the terminal device may be wirelessly connected to the base station device through a relay station device (or a repeater) at every frequency. That is, the base station device according to each embodiment of the present invention can also be replaced with the relay station device.

[Dual Connectivity]

Figure 12:
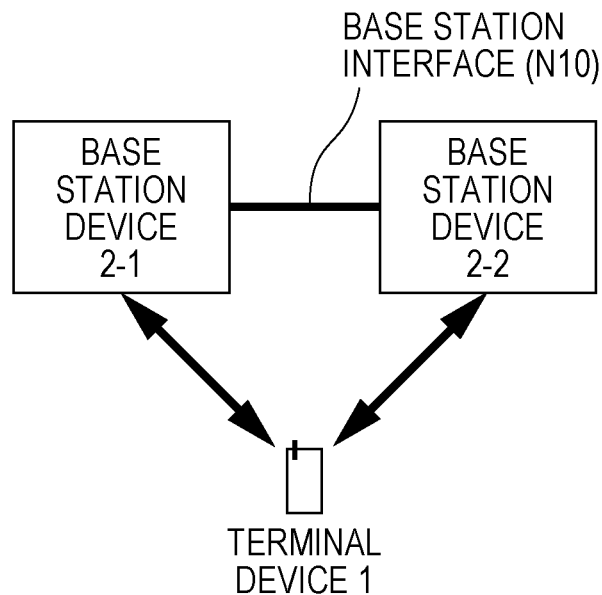
FIG. 12 is a diagram illustrating one example of an architecture of dual connectivity according to the embodiment of the present invention.

A basic architecture of dual connectivity is described referring to FIG. 12. FIG. 12 illustrates that the terminal device 1 makes connections to a plurality of base station devices 2 (which are indicated with a base station device 2-1 and a base station device 2-2) at the same time. The base station device 2-1 is assumed to be a base station device that constitutes a macro cell, and the base station device 2-2 is assumed to be a base station device that constitutes a small cell.

A connection in which, in this manner, the terminal device 1 makes connections at the same time using a plurality of cells that belong to the plurality of base station devices 2 is referred to as the dual connectivity, and the connection between the terminal device 1 and the plurality of base station devices 2 using a technology for realizing the dual connectivity is described using the expressions "using the dual connectivity", and "connection with the dual connectivity" or expressions having the same meaning as the expressions described above. The cells that belong to each base station device 2 may be managed with the same frequency, and may be managed with different frequencies.

Moreover, the carrier aggregation is different from the connection using the dual connectivity in that one base station device 2 manages a plurality of cells and a frequency differs from one cell to another, and in that a high-speed backbone line in which there is no need to consider an influence of delay is present between the plurality of cells. In other words, the carrier aggregation is a technology that connects one terminal device 1 and one base station device 2 through a plurality of cells that differ in frequency, and in contrast with this, the dual connectivity is a technology that connects one terminal device 1 and a plurality of base station device 2 through a plurality of cells that are the same in frequency or differ in frequency.

The terminal device 1 and the base station device 2 can apply the technology that is applied to the carrier aggregation to the dual connectivity. For example, the terminal device 1 and the base station device 2 may apply technologies, such as management (addition, deletion, change, and the like) of the primary cell and the secondary cell, configuration of a measurement method and a measurement event that correspond to the carrier aggregation, and activation/inactivation, to a cell that is connected using the dual connectivity.

In FIG. 12, the base station device 2-1 or the base station device 2-2 is connected to a Mobility Management Entity (MME) and a Serving Gateway (SGW) with a backbone line. The MME is among control station devices on a core network, and assumes the role of performing mobility management or authentication control (security control) of the terminal device 1 and configuring a user data path to the base station device 2, and the like. The SGW is among the control station devices in the core network, and assumes the role of transferring user data along the user data path to the terminal device 1 that is configured by the MME, and the like.

Furthermore, in FIG. 12, a connection path between the base station device 2-1 or the base station device 2-2, and the SGW is referred to as an S1-U interface. A connection path between the base station device 2-1 and the MME is referred to as an S1-MME interface. A connection path (a base station interface N10) between the base station device 2-1 and the base station device 2-2 is also referred to as an X2 interface in EUTRA. In the dual connectivity, a connection path between the MME and the terminal device 1 through the base station device 2-2 is not configured.

A first base station device (the base station device 2-1) that is connected to the MME is also referred to as a master base station device (Master eNB), and a second base station device (the base station device 2-2) that is not the master base station device is also referred to as a secondary base station device (Secondary eNB). A group of cells that are used for connection between the terminal device 1 and the master base station device is also referred to as a Master Cell Group (MCG), and a group of cells that are used for connection between the terminal device 1 and the secondary base station device is also referred to as a Secondary Cell Group (SCG).

Furthermore, a cell that belongs to the MCG is also referred to as a MCG cell, and a cell that belongs to the SCG is also referred to as an SCG cell. Furthermore, with respect to the SCG cell, among the SCG cells, a special SCG for which the Physical Uplink Control Channel (PUCCH) is configured and which serves the role similar to the role of the primary cell is referred to as a primary secondary cell (Primary SCell (PScell) or a special cell). For example, the primary secondary cell is a cell which, like the primary cell, is not deactivated, and for which configuration of the Physical Uplink Control Channel is performed or for which a content-based random access procedure is executed.

Although the present technology is referred to as the term dual connectivity, this does not mean that the number of the base station devices 2 that are connected to the terminal device 1 is limited to 2, and it is possible that the terminal device 1 also make connections to three or more base station devices 2.

[Power Headroom]

In a case where the Physical Uplink Shared Channel, or the Physical Uplink Shared Channel and the Physical Uplink Control Channel are transmitted on a current subframe, a Power Headroom (PH) indicates a difference between a power value that is calculated based on Real Transmission on the subframe, or a power value that is calculated (estimated) based on Virtual Transmission which uses a reference format, and a maximum transmit power of the terminal device, using information that is quantized for every cell. This means that the higher the power headroom, the more room there is for uplink transmission (that is, there is capacity available for transmit power) by the terminal device for every cell.

In the terminal device, the Power Headroom is calculated with a physical layer (Layer 1) based on a parameter that is configured from an RRC layer, and is managed with the MAC layer. Furthermore, with the physical layer, a value of the Power headroom of each component carrier, which is calculated, is notified to the MAC layer.

By reporting the power headroom to the base station device, the terminal device can provide a notification of how much transmit power is used per subframe. In other words, the terminal device can notify the base station how much room there is for uplink transmit power. The base station device can perform suitable scheduling by using the power headroom that is reported from the terminal device. For example, with regard to uplink resource allocation or transmit power control, the base station device can perform control in such a manner that the maximum transmit power of the terminal device is not exceeded.

In a case where any one of the following triggering conditions is satisfied, the MAC layer of the terminal device determines that now is a report timing for the power headroom, and transmits the power headroom to the base station device using the MAC control element that is included in a control header portion of transmission data. The triggering condition is when (1) a PH report prohibition timer (ProhibitPHR timer) stops, that is, when a path loss value of the serving cell is greater by a prescribed value or more than when the PH is previously reported, thereby causing an increase in path loss, (2) a PH periodic timer (Periodic PHR timer) expires, (3) a configuration of the power headroom is changed, and (4) the secondary cell is activated.

In Advanced ETURA, two types of report formats are stipulated as the power headroom. A first report type (type 1 PH) is a report type that is applied in a case where it is possible that the terminal device transmits only the Physical Uplink Shared Channel (PUSCH) on a certain subframe. For the type 1 PH, a method of calculating PHs that differ in a subframe on which the PUSCH is transmitted, and a subframe on which the PUSCH is not transmitted is used.

A second report type (type 2 PH) is a report type that is applied in a case where it is possible that the terminal device transmits the Physical Uplink Control Channel (PUCCH) and the Physical Uplink Shared Channel (PUSCH) on a certain subframe at the same time. For the type 2 PH, a method of calculating Power Headrooms that differ in a subframe on which the PUCCH and the PUSCH are transmitted at the same time, a subframe on which only the PUSCH is transmitted, and a subframe on which only the PUCCH is transmitted is used.

In a case where communication that uses a single cell is performed, the terminal device calculates a Power Headroom of the signal cell, and reports (transmits, or notifies) the Power Headroom, to the base station device, using the first report type. In a case where communication that uses a plurality of cells is performed, the terminal device calculates a Power Headroom for every cell that is configured, and reports (transmits, or notifies) the Power Headroom to the base station device, using the second report type. A cell that needs a report on the Power Headroom from the terminal device is a primary cell and a secondary cell that is activated.

Figure 13:
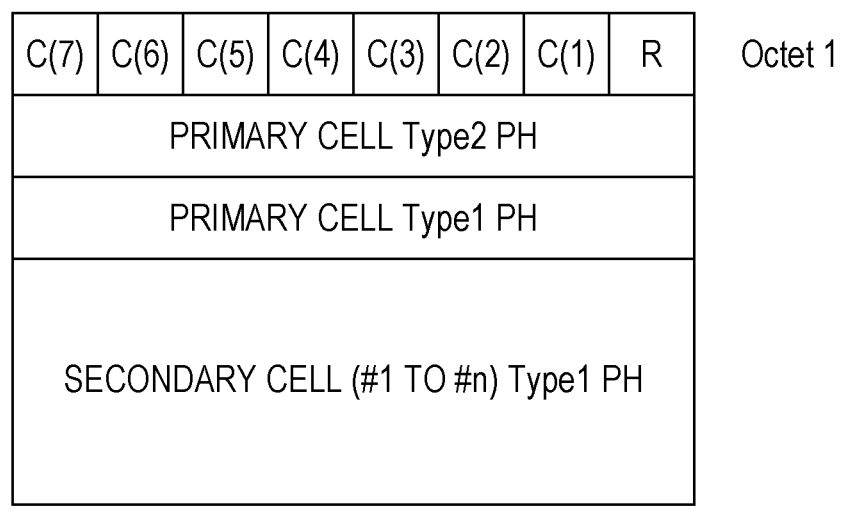
FIG. 13 is a diagram illustrating one example of a format of a control element that is used for a report of a power headroom in the related art.

FIG. 13 is a diagram illustrating a report type that is used for the report on the type 2 PH when the Power Headroom is triggered. Each line in FIG. 13 corresponds to one octet length (8 bits). In a case where the Power Headroom is triggered, the terminal device reports each of a field for bit map information that includes a cell index (C(i), i=1, 2, and so forth up to 7) of the secondary cell, which is to be reported, a field for the type 2 PH of the primary cell, a field for the type 1 PH of the primary cell, and a field for the type 1 PH of the secondary cell, in a state of being included in the MAC control element. The terminal device may report a nominal power (which is referred to as Pcmax) of the cell, as well as reporting the PH of each of the cells.

The type 1 PH of the secondary cell that corresponds to the cell index is sequentially configured to be in the field for the type 1 PH of the secondary cell. For example, in a case where the PH of the secondary cell for which cell index #1 and secondary index #3 are configured, in the field for bitmap information, "1" in every one octet is configured as a bit for each of C(1) and C(3) and "0" is configured as a bit for each of C(2), C(4) and so forth up to C(7). Furthermore, first a type PH of secondary cell #1 (which corresponds to C(1)) and then the type 1 PH of secondary cell #3 (which corresponds to C(3)) are included in the field for the type 1 PH of the secondary cell.

Based on the capability of the terminal device (UE capability), which is notified by the terminal device, the base station device configures which of the type 1 PH and the type 2 PH is used, for every terminal device, using the layer 3 message.

Suitable embodiments of the present invention will be described in detail below considering the matters described above and referring to the accompanying drawings. Moreover, when the embodiments of the present invention are described, in a case where it is determined that a specific description of a known function or constitution associated with the embodiment of the present invention makes the gist of the embodiment of the present invention indefinite, a detailed description thereof is omitted.

First Embodiment

A first embodiment of the present invention will be described below.

FIG. 1 is a block diagram illustrating one example of a terminal device 1 according to the first embodiment of the present invention. The present terminal device 1 is constituted at least from a reception unit 101, a demodulation unit 102, a decoding unit 103, a reception data control unit 104, a physical layer control unit 105, a transmission data control unit 106, a coding unit 107, a modulation unit 108, a transmission unit 109, and a radio resource control unit 110. The "units" in the drawings are elements that are expressed, also with the terms circuit, constituent element, device, unit, and the like and that realize a function of the terminal device 1 and each procedure.

The radio resource control unit 110 is a block that performs each function of the radio resource control (RRC) layer that executes Radio Resource Control of the terminal device 1. Furthermore, the reception data control unit 104 and the transmission data control unit 106 are blocks that perform each function in a Medium Access Control (MAC) layer that manages a data link layer, a Radio Link Control (RLC) layer, and a Packet Data Convergence Protocol (PDCP) layer.

Moreover, the terminal device 1 may be constituted from multiple blocks (the reception unit 101, the demodulation unit 102, and the decoding unit 103) in a reception system and multiples blocks (the coding unit 107, the modulation unit 108, and the transmission unit 109) in a transmission system, in order that, by using the carrier aggregation and/or the dual connectivity, multiple frequencies (frequency bands or frequency bandwidth) or reception processing within the same subframe of the cell can be supported in the reception system and multiple frequencies (frequency bands or frequency bandwidth) or transmission processing with the same subframe of the cell can be supported in the transmission system.

Furthermore, the terminal device 1 may be constituted in such a manner that it is possible that terminal device 1 includes multiple reception data control units 104, multiple physical layer control units 105, multiple transmission data control units 106, and multiple radio resource control units 110, for every corresponding base station device. That is, the terminal device 1 may be constituted to include a physical layer, a MAC layer, an RLC layer, a PDCH layer that correspond to the primary base station device, and a physical layer, a MAC layer, an RLC layer, and a PDCP layer that correspond to the primary base station device. However, it is desirable that in this case, one RRC layer is also included in the terminal device 1.

With regard to the reception processing by the terminal device 1, reception data control information is input from the radio resource control unit 110 into the reception data control unit 104, and physical layer control information that is a control parameter for controlling each block is input into the physical layer control unit 105. The physical layer control information is information that is constituted from reception control information and transmission control information and that includes a parameter configuration indispensable for wireless communication control by the terminal device 1.

The physical layer control information is configured by a wireless connection resource configuration that is transmitted in a dedicated manner from the base station device 2 to the terminal device 1, cell-specific broadcast information, a system parameter, or the like, and, if need arises, is input by the radio resource control unit 110 into the physical layer control unit 105. The physical layer control unit 105 suitably inputs the reception control information, which is control information relating to the reception, to the reception unit 101, the demodulation unit 102, and the decoding unit 103.

Included in the reception control information are pieces of information, as downlink scheduling information, such as reception frequency band information, reception timing relating to the physical channel and the physical signal, a multiplexing method, and radio resource control information. Furthermore, the reception data control information is downlink control information that includes secondary cell deactivation timer information, DRX control information, multicast data reception information, downlink retransmission control information, and the like. Additionally, control information relating to the downlink in each of the MAC layer, the RLC layer, and the PDCP layer is included in the reception data control information.

The reception signal is received in the reception unit 101. The reception unit 101 receives a signal from the base station device 2 in accordance with the frequency and the frequency band that are notified with the reception control information. The signal that is received is input into the demodulation unit 102. The demodulation unit 102 performs demodulation of the signal. The demodulation unit 102 inputs a post-demodulation signal into the decoding unit 103. The decoding unit 103 decodes the signal that is input, and inputs each piece of data (which is also referred to as downlink data, downlink control data, or a downlink transport block) that results from the decoding, into the reception data control unit 104. Furthermore, as well as each piece of data, the MAC control element that is transmitted from the base station device 2 is decoded in the decoding unit 103, and related data is input into the reception data control unit 104.

The reception data control unit 104 performs control (for example, cell activation/deactivation, DRX control, transmission timing adjustment, and the like) of the physical layer control unit 105, which is based on the received MAC control element, performs buffering of each piece of data that results from the decoding, and performs error correction control (HARQ) of data that is retransmitted. Each piece of data that is input into the reception data control unit 104, that is, related data is input into (transferred to) the radio resource control unit 110.

With regard to the transmission processing by the terminal device 1, transmission data control information is input from the radio resource control unit 110 into the transmission data control unit 106, and the physical layer control information that is a control parameter for controlling each block is input into the physical layer control unit 105. The physical layer control unit 105 suitably inputs the transmission control information that is control information relating to the transmission, into the coding unit 107, the modulation unit 108, and the transmission unit 109. Included in the transmission control information are pieces of information, as uplink scheduling information, such as coding information, modulation information, transmission frequency band information, transmission timing relating to the physical channel and the physical signal, the multiplexing method, and the radio resource arrangement information.

Furthermore, the transmission data control information is uplink control information that includes DTX control information, the random access configuration information, uplink shared channel information, logical channel priority information, resource request configuration information, cell group information, uplink retransmission control information, power headroom report information, and the like. The radio resource control unit 110 may configure a plurality of random access configuration information that correspond to a plurality of cells, respectively, for the transmission data control unit 106.

Furthermore, the radio resource control unit 110 manages the transmission timing adjustment information and the transmission timing timer that are used for adjustment of the uplink transmission timing, and manages an uplink transmission timing state (a transmission timing adjusted state or a transmission timing non-adjusted state) for every cell (every cell group or every TA group). The transmission timing adjustment information and the transmission timing timer are included in the transmission data control information.

Moreover, in a case where there is a need to manage multiple uplink transmission timing states, the transmission data control unit 106 manages the transmission timing adjustment information that corresponds to the uplink transmission timing in each of the plurality of cells (the cell group or the TA group). Included in the resource request configuration information are at least maximum transmission counter configuration information and radio resource request prohibition timer information. The radio resource control unit 110 may configure a plurality of resource request configuration information that correspond to a plurality of cells, respectively, for the transmission data control unit 106.

The transmission data (which is also referred to as the uplink data, the uplink control data, or an uplink transport block) that is originated in the terminal device 1 is input from the radio resource control unit 110 into the transmission data control unit 106 at an arbitrary timing. At this time, the transmission data control unit 106 calculates an amount of transmission data (an amount of uplink buffer) that is input. Furthermore, the transmission data control unit 106 has a function of determining whether the transmission data that is input is data that belongs to the control-plane or is data that belongs to the user-plane.

Furthermore, when the transmission data is input, the transmission data control unit 106 stores the transmission data in an uplink buffer (not illustrated) within the transmission data control unit 106. Then, the transmission data control unit 106 determines whether or not the radio resource indispensable for the transmission of the transmission data that is input is allocated to the terminal device 1. The transmission data control unit 106 selects any one of the radio resource request that uses the Physical Uplink Shared Channel (PUSCH) and the Physical Uplink Control Channel (SR-PUCCH) and the radio resource request that uses the Physical Random Access Channel, based on radio resource allocation, and makes a request to the physical layer control unit 105 for control processing for transmitting the selected channel.

Furthermore, the transmission data control unit 106 determines whether the triggering condition relating to the report on the Power Headroom is satisfied. In a case where the report on the Power Headroom is triggered, the transmission data control unit 106 generates the MAC control element that is used for a power headroom report, based on a result of calculation of the Power Headroom for every cell (every component carrier) that is notified by the physical layer. Furthermore, in accordance with the transmission control information, the coding unit 107 suitably codes each piece of data and inputs a result of the coding into the modulation unit 108.

Based on a channel architecture in which each piece of coded data is transmitted, the modulation unit 108 performs suitable modulation processing. As well as mapping each piece of data being modification-processed to the frequency domain, the transmission unit 109 converts a signal in the frequency domain into a signal in the time domain, superimposes the resulting signal on a carrier wave in a fixed frequency, and performs power amplification. In accordance with the transmission timing adjustment information for every cell (every cell group or every TA group), which is input from the radio resource control unit 110, the transmission unit 109 further adjusts the uplink transmission timing.

It is possible that the Physical Uplink Shared Channel to which the uplink control data is mapped also includes, for example, the layer 3 message (a radio resource control message or the RRC message) in addition to the user data.

Other constituent elements of the terminal device 1 and a transfer path for data (the control information) between the constituent elements are omitted in FIG. 1, but it is apparent that multiple blocks that have other functions indispensable for the terminal device 1 to operate are retained as constituent elements. For example, a NAS layer unit that, along with a core network, executes control, or an application layer unit is present above the radio resource control unit 110.

Figure 2:
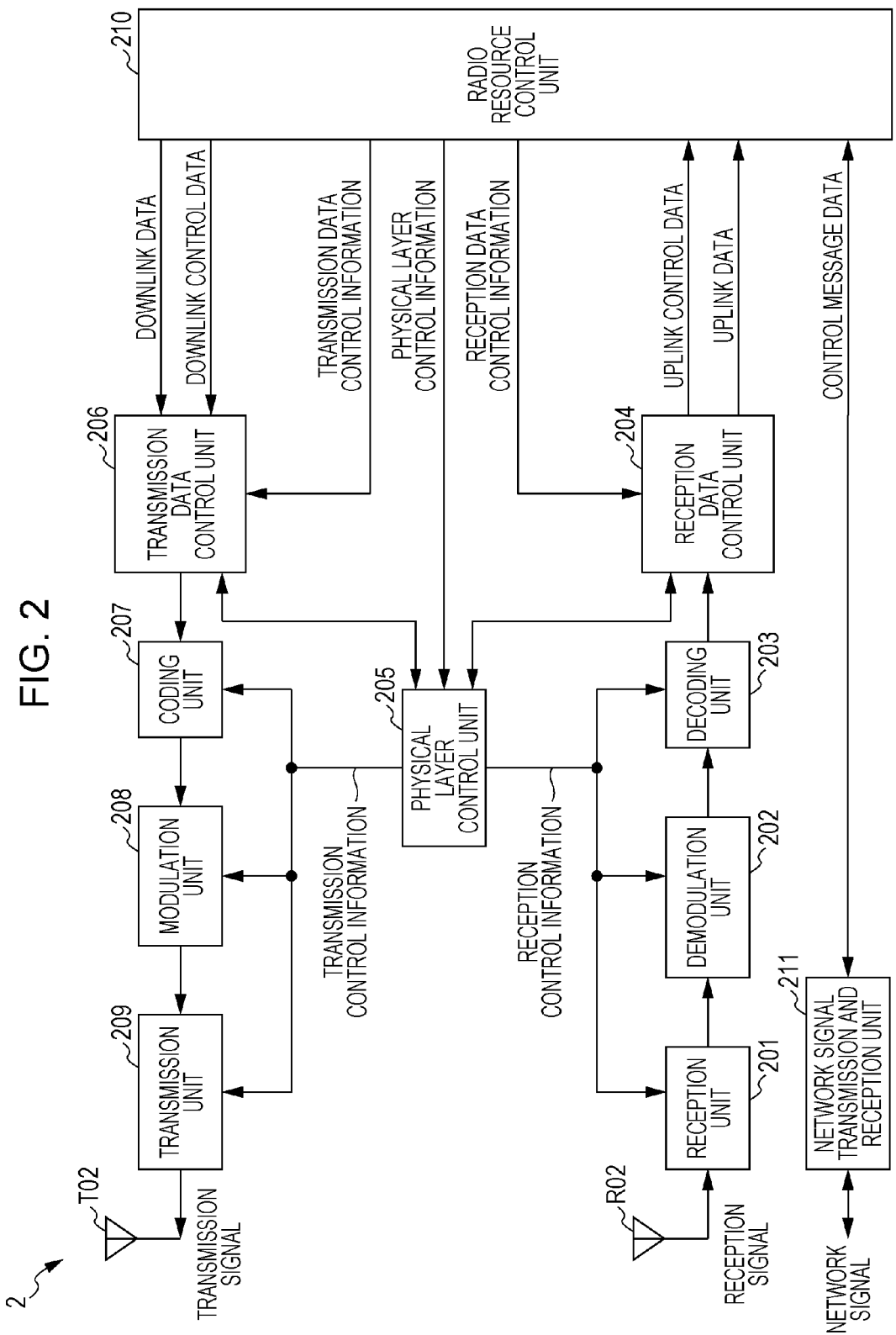
FIG. 2 is a block diagram illustrating one example of a schematic constitution of a base station device according to the embodiment of the present invention.

FIG. 2 is a block diagram illustrating one example of a base station device 2 according to the first embodiment of the present invention. The present base station device is constituted at least from a reception unit 201, a demodulation unit 202, a decoding unit 203, a reception data control unit 204, a physical layer control unit 205, a transmission data control unit 206, a coding unit 207, a modulation unit 208, a transmission unit 209, a radio resource control unit 210, and a network signal transmission and reception unit 211. The "units" in the drawings are elements that are expressed, also with the terms circuit, constituent element, device, unit, and the like and that perform a function of the base station device 2 and execute each procedure.

The radio resource control unit 210 is a block that performs each function of the Radio Resource Control (RRC) layer that executes the Radio Resource Control of the base station device 2. Furthermore, the reception data control unit 204 and the transmission data control unit 206 are blocks that perform each function in the Medium Access Control (MAC) layer that manages the data link layer, the Radio Link Control (RLC) layer, and the Packet Data Convergence Protocol (PDCP) layer.

Moreover, the base station device 2 may be constituted from multiple blocks (the reception unit 201, the demodulation unit 202, and the decoding unit 203) in the reception system and multiple blocks (the coding unit 207, the modulation unit 208, and the transmission unit 209) in the transmission system, in order that, by using the carrier aggregation and/or the dual connectivity, multiple frequencies (frequency bands or frequency bandwidth) are supported. Furthermore, the base station device 2 may include multiple reception data control units 204, multiple physical layer control units 205, multiple transmission data control units 206, multiple radio resource control units 210, and multiple network signal transmission and reception units 211.

The radio resource control unit 210 inputs the downlink data and the downlink control data into the transmission data control unit 206. In a case where the MAC control element that is to be transmitted to the terminal device 1 is present, the transmission data control unit 206 inputs the MAC control element and each piece of data (the downlink data or the downlink control data) into the coding unit 207. The coding unit 207 codes the MAC control element and each piece of data, which are input, and inputs results of the coding into the modulation unit 208. The modulation unit 208 performs modulation of the coded signal.

Furthermore, the signal that is modulated in the modulation unit 208 is input into the transmission unit 209. After mapping each piece of data being input to the frequency domain, the transmission unit 209 converts a signal in the frequency domain into a signal in the time domain, superimposes the resulting signal on a carrier wave in the fixed frequency, performs the power amplification, and performs the transmission. The Physical Downlink Shared Channel to which the downlink control data is mapped typically constitutes the layer 3 message (the RRC message).

Furthermore, the reception unit 201 converts the signal that is received from the terminal device 1 into a digital signal in a baseband. In a case where cells at multiple different transmission timings are configured for the terminal device 1, the reception unit 201 receives the signal at different timings for every cell (every cell group or every TA group). The digital signal that results from the conversion in the reception unit 201 is input into the demodulation unit 202 and is demodulated. The signal that results from the demodulation in the demodulation unit 202 is subsequently input into the decoding unit 203. The decoding unit 203 decodes the signal that is input, and inputs each piece of data (the uplink data and the uplink control data) that results from the decoding, into the reception data control unit 204. Furthermore, as well as each piece of data, the MAC control element that is transmitted from the terminal device 1 is decoded in the decoding unit 203, and related data is input into the reception data control unit 204.

The reception data control unit 204 performs control (for example, control relating to the power headroom report, control relating to a buffer status report, or the like) of the physical layer control unit 205, which is based on the received MAC control element, performs buffering of each piece of data that results from the decoding, and performs the error correction control (HARQ) of data that is retransmitted. Each piece of data that is input into the reception data control unit 204, that is, related data is input into (transferred to) the radio resource control unit 210.

The physical layer control information that is indispensable for these types of control of each block is information that is constituted from reception control information and transmission control information and that includes a parameter configuration indispensable for wireless communication control by the base station device 2. The physical layer control information is configured by the higher-level network device (an MME, a gateway device (SGW), an OAM, or the like) or the system parameter, and, if need arises, is input by the radio resource control unit 210 into the control unit 204.

The physical layer control unit 205 inputs the physical layer control information associated with the transmission, as the transmission control information, into each of the blocks, that is, the coding unit 207, the modulation unit 208, and the transmission unit 209, and suitably inputs the physical layer control information associated with the reception, as the reception control information, into each of the blocks, that is, the reception unit 201, the demodulation unit 202, and the decoding unit 203.

The control information relating to the uplink, of the terminal device 1 for each of the MAC layer, the RLC layer, and the PDCP layer of the base station device 2 is included in the reception data control information. Furthermore, the control information relating to the downlink, of the terminal device 1 for each of the MAC layer, the RLC layer, and the PDCP layer of the base station device 2 is included in the transmission data control information. That is, the reception data control information and transmission data control information are configured for every terminal device 1.

The network signal transmission and reception unit 211 performs the transmission (transfer) or reception of a control message between the base station device 2 and another base station device 2 or between the higher-level network device (the MME or the SGW) and the base station device 2, or of the user data. Other constituent elements of the base station device 2 and the transfer path for data (the control information) between the constituent elements are omitted in FIG. 2, but it is apparent that multiple blocks that have other functions indispensable for the base station device 2 to operate are retained as constituent elements. For example, a Radio Resource Management unit or an application layer unit is present over the radio resource control unit 210.

Figure 3:
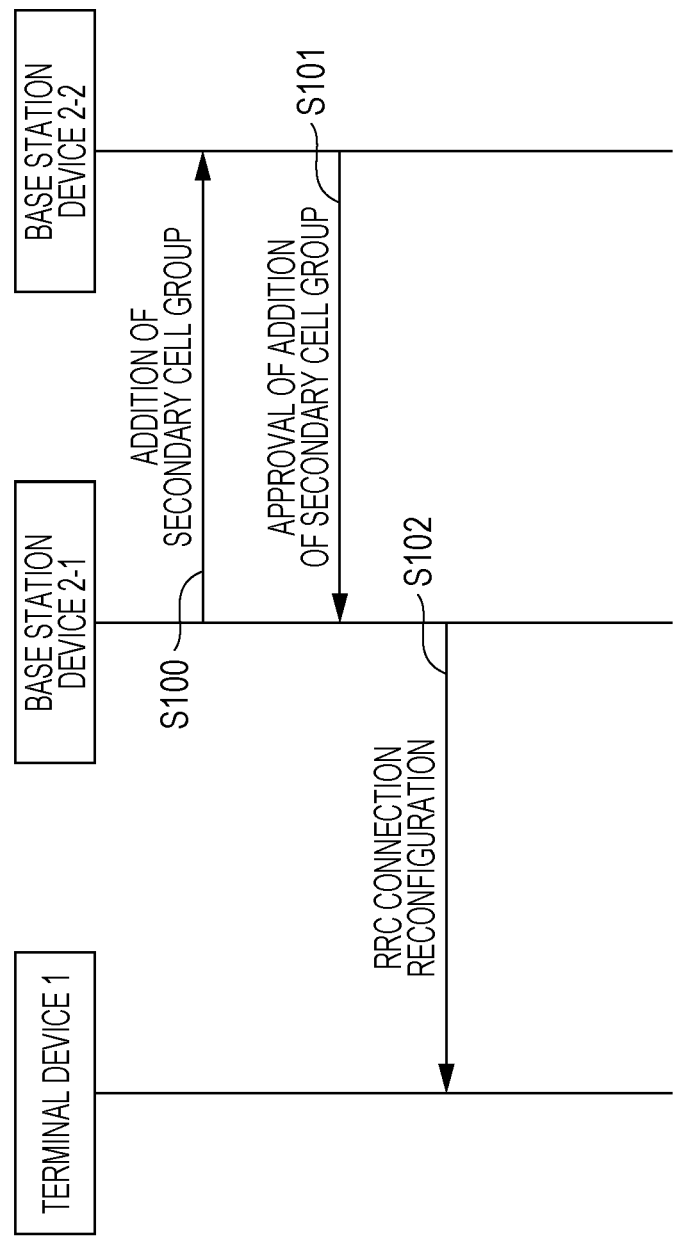
FIG. 3 is one example of a sequence chart illustrating an allocation procedure for a cell according to a first embodiment of the present invention.

FIG. 3 illustrates one example of a sequence chart relating to an allocation procedure for the secondary cell according to the first embodiment of the present invention.

In FIG. 3, the terminal device 1 and the base station device 2 are in a state of being connected to each other using a plurality of cells. Furthermore, the base station device 2 includes the base station device 2-1 and the base station device 2-2. Typically, the base station device 2-1 is the base station device 2 that constitutes the macro cell, and the base station device 2-2 is the base station device 2 that constitutes the small cell, but this does not limit a constitution of the corresponding cell.

First, the base station device 2-1 that is a master base station device makes a decision to start communication using the dual connectivity. Then, a decision is made to add a cell (a secondary cell group cell) of the base station device 2-2 that is a secondary base station to the terminal device 1, and a secondary cell group addition message is generated and is transmitted to the base station device 2-2 (Step S100).

The base station device 2-1 transmits capability information on the terminal device 1 or information on a cell that is an addition target, in a state of being included in the secondary cell group addition message. The base station device 2-1 can determine the cell that is an addition target, based on one or multiple combinations of a measurement event report or a CSI report, and information such as a cell load situation. Furthermore, the base station device 2-1 can determine the cell that is an addition target, using pieces of information other than this.

At this time, the base station device 2-1 may notify the base station device 2-2 of identification information (cell index information or a cell index number) of the secondary cell that is configured for the terminal device 1. With the notification of the second index information on the secondary cell, the base station device 2-2 can allocate a cell index number that is different from a cell index of a cell of the base station device 2-1.

Furthermore, the base station device 2-1 may notify the base station device 2-2 of a range of the cell index information (the cell index number) of the secondary cell that is reserved for the terminal device 1. For example, a notification that cell indexes #1 to #4 are available (available for allocation) in the base station device 2-1 and cell indexes #5 to #7 are available in the base station device 2-2 may be provided. Furthermore, a notification that cell indexes #1, #2, and #4 are available in the base station device 2-1 and cell indexes #3, and #5 to #7 are available in the base station device 2-2 may be provided. With the notification of the range of the second index information on the secondary cell, the base station device 2-2 can allocate the cell index number that is different from the cell index of the cell of the base station device 2-1.

The base station device 2-2 receives the secondary cell group addition message, and if it is possible that a designated cell is configured for (added to) the terminal device 1, generates a secondary cell group addition approval message for transmission to the base station device 2-1 (Step S101). At this time, the base station device 2-2 transmits at least a radio resource configuration (for example, broadcast information on the secondary cell group, a radio resource shared configuration, a random access configuration, configuration information on the Physical Uplink Control Channel, and the like) relating to a cell in the secondary cell group that is to be added, in a state of being included in the secondary cell group addition approval message.

The base station device 2-1 transmits the radio resource configuration that is included in the secondary cell group addition approval message to the terminal device 1, in a state of being included in an RRC connection reconfiguration message (Step S102). Included in the RRC connection reconfiguration message is at least one configuration of the cell in the secondary cell group that is to be added. The RRC connection reconfiguration message is the layer 3 massage, and is, for example, a RRCConnectionReconfiguration message.

FIG. 4 is a diagram illustrating one example of allocation of the cell index (the cell index number) that is notified by the base station device 2 to the terminal device 1, according to the first embodiment. As described above, because the cell index information is exchanged in advance between the base station device 2-1 and the base station device 2-2, the cell index that is configured for the terminal device 1 is adjusted (coordinated) between each other's cell groups. In other words, it is guaranteed that different cell indexes are allocated to cells in the MCG and SCG that are configured for the terminal device 1, respectively.

For example, for the terminal device 1, the primary cell, secondary cell #1, and secondary cell #2 are configured as cells in the MCG, and secondary cell #3 and secondary cell #4 are configured as cells in the SCG Moreover, secondary cell #3 is a primary secondary cell.

At this time, for the terminal device 1, as cell index numbers, cell index #0 is configured for the primary cell, cell index #1 for secondary cell #1, cell index #2 for secondary cell #2, cell index #3 for secondary cell #3, and cell index #4 for secondary cell #4. Moreover, cell index #0 is allocated to a cell index of the primary cell in a dynamic (static or fixed) manner.

Furthermore, the base station device 2 may not allocate the cell index of the primary secondary cell in a dedicated manner to every terminal device 1, and may allocate cell index #1 to every terminal device 1 in a dynamic manner. That is, in the dual connectivity, cell index #0 and cell index #1 can be regarded as being reserved in advance for the primary cell and the primary secondary cell, respectively.

In this case, the base station device 2 may not explicitly notify the terminal device 1 of the cell index number of the primary secondary cell. The terminal device 1 may regard an SCG cell to which cell index #1 is allocated, as the primary secondary cell, and may accordingly perform control.

In this manner, a method of controlling the master base station device and the secondary base station device using the cell index number in a case where allocation of the cell index number that is configured for the terminal device 1 in advance between the master base station device and the secondary base station device is adjusted will be described in detail below.

<PH Report>

As illustrated in FIG. 13, in a case where the PH relating to the secondary cell is reported, the terminal device 1 needs to include the cell index number in every one octet. At this point, it is guaranteed that the cell index number is not redundantly allocated to the MCG and the SCG, and thus the terminal device 1 can use every possible report type (format) in the related art. Because of this, overhead at the time of reporting can be reduced.

Figure 5:
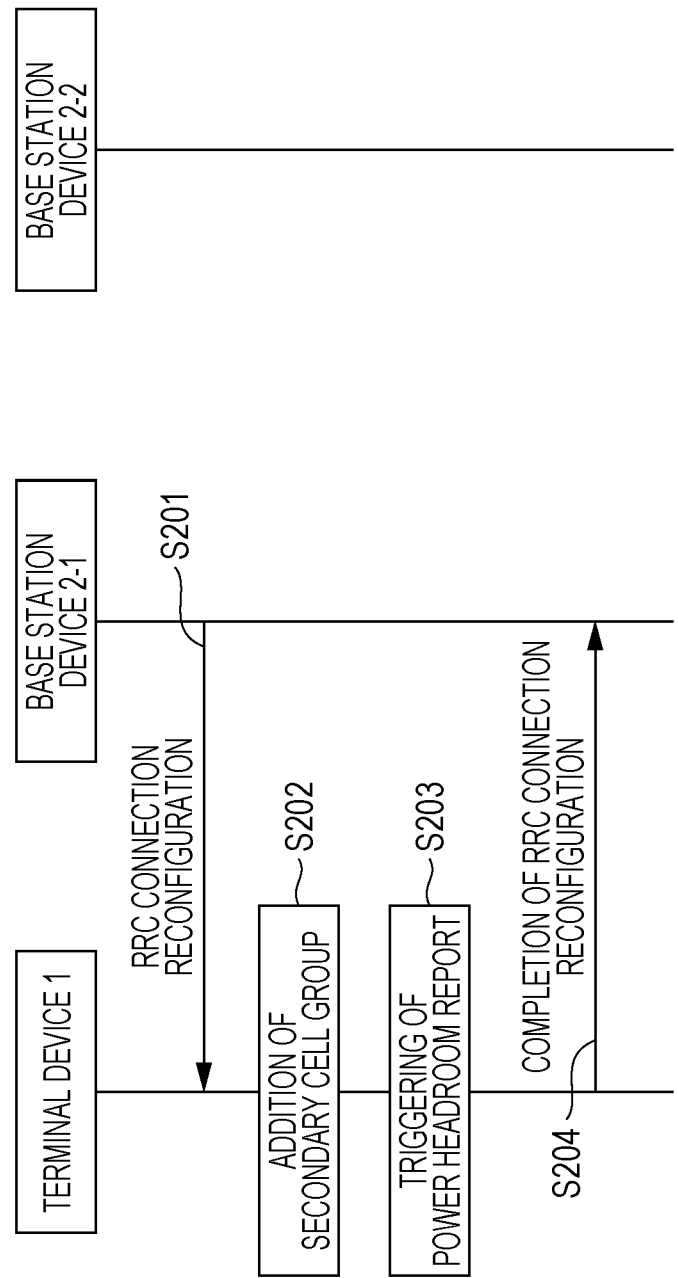
FIG. 5 is one example of a sequence chart illustrating a procedure for reporting a Power Headroom according to the first embodiment of the present invention.

FIG. 5 is one example of a sequence chart illustrating a procedure for reporting the Power Headroom. The RRC connection reconfiguration message in Step S201 in FIG. 5 is an RRC connection reconfiguration message indicating addition of the cell in the secondary cell group in S102 in FIG. 3.

The terminal device 1 receives the RRC connection reconfiguration message, and adds the cell (the secondary cell group) of the base station device 2-2 in accordance with configuration information on the secondary cell group, which is included in the RRC connection reconfiguration message (Step S202). At this time, the MAC layer, the RLC layer, and the PDCP layer that correspond to the base station device 2-2 are also configured (established). At least the primary secondary cell is included in the cell that is to be added.

The terminal device 1 that adds the primary secondary cell triggers the power headroom report (Step S203). In other words, the power headroom report is triggered when the MAC layer that corresponds to the secondary base station device (the base station device 2-2) is newly established in the terminal device 1. Then, the terminal device 1 includes the primary cell in the MCG that is present before adding the cell in the secondary cell group, the secondary cell in the MCG, which, if configured, is activated, and the primary secondary cell, as the power headroom that is reported, at least in the MAC control element.

Furthermore, in a case where processing through the use of the RRC connection reconfiguration message is ended, the terminal device 1 transmits an RRC connection reconfiguration completion message to the base station device 2-1. The RRC connection reconfiguration completion message is the layer 3 massage, and is, for example, an RRC-ConnectionReconfigurationComplete message. The Power Headroom that is triggered in Step S203 may be transmitted by the terminal device 1 in a state of being included in an RRC connection reconfiguration completion message, and may be reported by the terminal device 1 to the base station device 2-1 with a subsequent physical uplink shared data channel that is transmitted based on an uplink resource allocation (an uplink grant).

Furthermore, the Power Headroom that is triggered in Step S203 may be transmitted by the terminal device 1 using the random access procedure in the primary secondary cell, may be transmitted by the terminal device 1 to the base station device 2-2 on the physical uplink shared data channel (the message 3), and may be reported by the terminal device 1 to the base station device 2-2 on the physical uplink shared data channel that is transmitted based on the subsequent uplink resource allocation (the uplink grant).

FIG. 6 is a diagram for describing a report type of the Power Headroom of the SCG cell that is transmitted from the terminal device 1 to the base station device 2 (the base station device 2-1 and the base station device 2-2).

Each line in FIG. 6 corresponds to one octet length (8 bits). In the case where the Power Headroom is triggered, the terminal device 1 arranges (includes) a field for bitmap information that includes a cell index (C(i), i=1, 2, and so forth up to 7) of each of the primary secondary cell and the secondary cell in the SCG, which is to be reported, a field for the type 2 PH of the primary cell, a field for the type 1 PH of the primary cell, a field for the type 2 PH of the primary secondary cell, a field for the type 1 PH of the primary secondary cell, and a field for the type 1 PH of the secondary cell that is activated, in an order that is illustrated in FIG. 6, generates a MAC control element, transmits the generated MAC control element to the base station device 2, and thus reports the Power Headroom. The terminal device 1 may report the nominal power (which is referred to as Pcmax), as well as reporting the Power Headroom each of the cells.

Moreover, the terminal device 1 may not configure a bit for the field (C(i)) for the bitmap information on the cell index that corresponds to the primary secondary cell in FIG. 6. That is, in a case where the cell index of the secondary cell that reports the Power Headroom is configured to be "1", the field (C(i)) for the bitmap information on the cell index that corresponds to the primary secondary cell may be configured to be "0". For example, even in a case where cell index #3 is configured for the cell index that corresponds to the primary secondary cell, C(3) may be configured to be "0".

Furthermore, the terminal device 1 may regard a bit for the field (C(i)) for the bitmap information of the cell index that corresponds to the primary secondary cell in FIG. 6, as a reserve bit (R).

In a case where in the communication using the dual connectivity, the Power Headroom is triggered, the terminal device 1 generates the MAC control element (FIG. 6) for the Power Headroom that includes a type 2 PH of a secondary primary cell, instead of the MAC control element (FIG. 13) for the Power Headroom in the related art, and positions (includes) the generated MAC control element within the MAC PDU for transmission.

Furthermore, in the communication using the dual, base station device 2 receives the MAC PDU that is transmitted from the terminal device 1, and receives the MAC control element that includes the type 2 PH of the secondary primary cell, which is regarded as being positioned within the MAC PDU.

<Activation/Deactivation>

Figure 7:
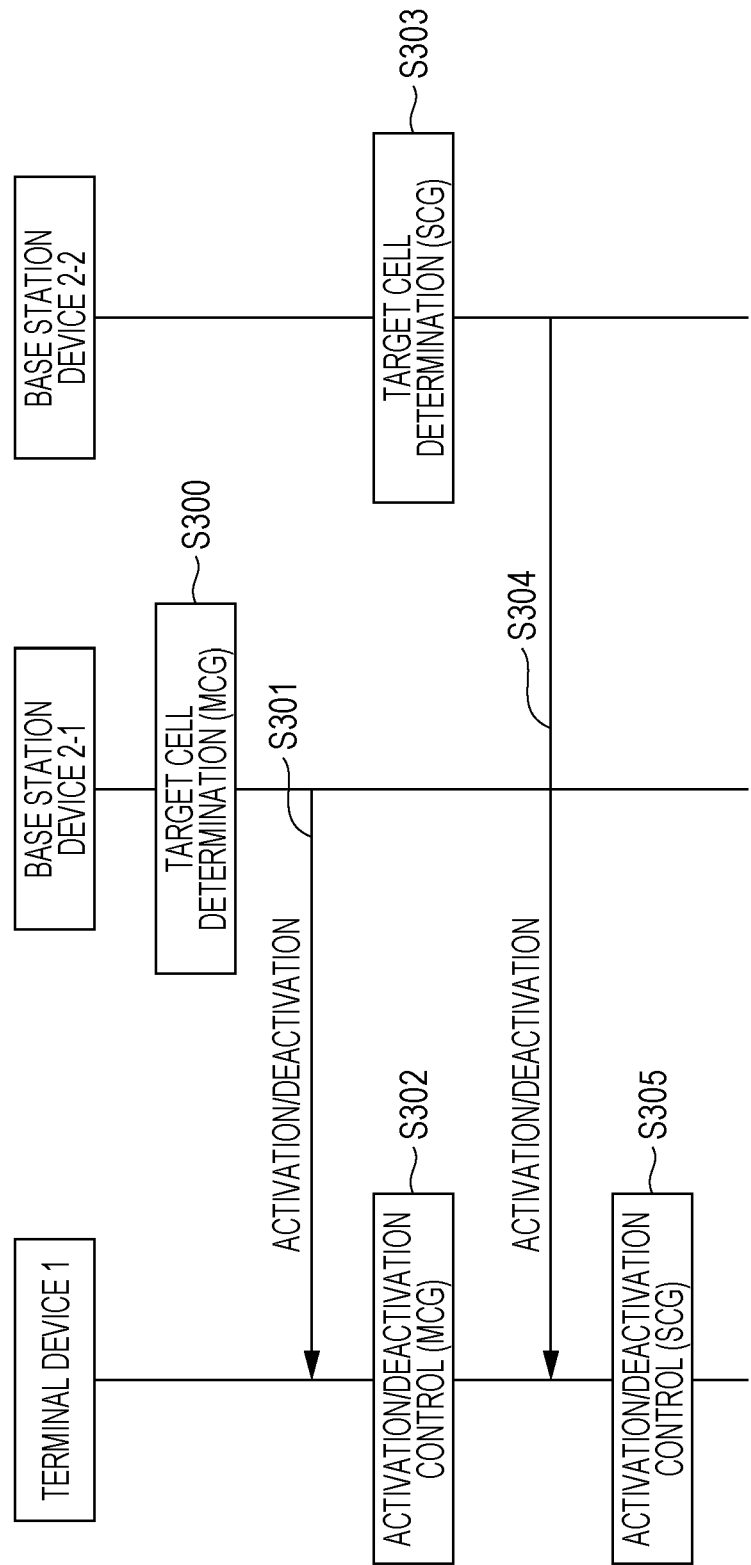
FIG. 7 is one example of a sequence chart illustrating a procedure for cell activation/deactivation according to the first embodiment of the present invention.

FIG. 7 is one example of a sequence chart illustrating a procedure for the cell activation/deactivation. In FIG. 7, the processing starts from a state where, with the dual connectivity, the MCG cell of the base station device 2-1 and the SCG cell of the base station device 2-2 are configured for the terminal device 1.

The base station device 2-1 controls the activation and/or deactivation of the secondary cell, among the MCS cells that are configured for the terminal device 1. In the same manner, the base station device 2-2 notifies the activation and/or deactivation of the secondary cell, among the SCG cells that are configured for the terminal device 1. That is, the base station device 2-1 that manages the MCG cell does not control the activation and/or deactivation of the secondary cell of the base station device 2-2 that manages the SCG cell. Furthermore, the base station device 2-2 that manages the SCG cell does not control the activation and/or deactivation of the secondary cell of the base station device 2-1 that manages the MCG cell.

The terminal device 1 controls a cell state of only the secondary cell (including the primary secondary cell) to which the received cell belongs. In other hands, only the cell index that corresponds to the cell group, among the cell indexes that are included in the MAC control element which indicates the activation/deactivation may be considered.

In an example in FIG. 7, in Step S300, the base station device 2-1 determines a cell that is a target for the activation and/or deactivation, which is among the MCG cells. At this time, the base station device 2-1 may not consider a state of the SCG cell in the base station device 2-2.

The base station device 2-1 generates the MAC control element (Activation/Deactivation MAC-CE) indicating the activation/deactivation, and transmits the generated MAC control element to the terminal device 1 (Step S301). The base station device 2-1 can use a format that is illustrated in FIG. 13, as the MAC control element indicating the activation/deactivation.

In a case where the MAC control element indicating the activation/deactivation is received from the base station device 2-1, the terminal device 1 regards only the secondary cell that belongs to the MCG, as an activation/deactivation target, and accordingly performs control (processing) (Step S302). That is, the terminal device 1 performs the control for the activation/deactivation in accordance with a cell index information field that corresponds to the secondary cell which is configured as the MCG cell for the terminal device 1, among cell index information fields within the MAC control element indicating the activation/deactivation, which is received from the base station device 2-1.

Furthermore, the terminal device 1 may disregard a cell index information field other than the cell index information field that corresponds to the secondary cell which is configured as the MCG cell, and may regard such a cell index information field as a reserve bit.

Furthermore, the terminal device 1 may disregard the cell index information field that corresponds to the secondary cell which is configured as the SCG cell, and may regard the cell index information field as a reserve bit.

For example, when the cell index that is illustrated in FIG. 4 is allocated to the terminal device 1, in a case where secondary cell #1 is activated, or secondary cell #2 is changed to a deactivated state, the base station device 2-1 configures "1 (activation)" for C(1) and "0 (deactivation)" for C(2) in the C(i) field for transmission. Because C(3) to C(7) are not considered (or, are disregarded) in the terminal device 1, any one of "0" and "1" may be configured, but it is desirable that for the purpose of debugging, only one of "0" and "1" is uniformly configured.

Furthermore, in Step S303, the base station device 2-2 determines a cell that is a target for the activation and/or deactivation, which is among the SCG cells. The base station device 2-2 may not consider a state of the MCG cell in the base station device 2-1.

The base station device 2-2 generates the MAC control element indicating the activation/deactivation, and transmits the generated MAC control element to the terminal device 1 (Step S304). The base station device 2-2 can use a format that is illustrated in FIG. 11, as the MAC control element indicating the activation/deactivation.

In a case where the MAC control element indicating the activation/deactivation is received from the base station device 2-2, the terminal device 1 regards only the secondary cell that belongs to the SCG, as an activation/deactivation target, and accordingly performs control (processing) (Step S305). That is, the terminal device 1 performs the control for the activation/deactivation in accordance with a cell index information field that corresponds to the secondary cell which is configured as the SCG cell for the terminal device 1, among cell index information fields within the MAC control element indicating the activation/deactivation, which is received from the base station device 2-2.

Furthermore, the terminal device 1 may disregard a cell index information field other than the cell index information field that corresponds to the secondary cell which is configured as the SCG cell, and may regard such a cell index information field as a reserve bit.

Furthermore, the terminal device 1 may disregard the cell index information field that corresponds to the secondary cell which is configured as the MCG cell, and may regard the cell index information field as a reserve bit.

For example, when the cell index that is illustrated in FIG. 4 is allocated to the terminal device 1, in a case where secondary cell #4 is changed to an activated state, the base station device 2-2 configures "1 (activation)" for C(4) in the C(i) field for transmission. Because C(1) and C(2) and C(5) to C(7) are not considered (or, are disregarded) in the terminal device 1, any one of "0" and "1" may be configured, but it is desirable that for the purpose of debugging, only one of "0" and "1" is uniformly selected for transmission.

Moreover, furthermore, "1" may be configured at all times for the cell index (cell index #3 (C(3))) in an example in FIG. 4) that corresponds to the primary secondary cell, the cell index information field that corresponds to the primary secondary cell may not be considered considering that the primary secondary cell is at all times activated, and thus may be disregarded in the terminal device 1, and be regarded as a reserve bit. In a case where the terminal device 1 does not consider the cell index information field that corresponds to the primary secondary cell, the base station device 2-2 may configure "0" for the cell index that corresponds to the primary secondary cell.

A procedure that includes Step S300 to Step S302 in FIG. 7 may be executed independently of a procedure that includes Step S303 to Step S305. For example, the procedure that includes Step S303 to Step S305 may be started earlier than or in the middle of the procedure that includes Step S300 to Step S302.

<SCG Cell Radio Resource Configuration>

In a case where the SCG cell is added, the base station device 2 notifies the terminal device 1 of the cell index number that corresponds to the SCG cell to be added, in a state of being included in a configuration of the SCG cell. Moreover, as described above, the base station device 2 does not explicitly notify the cell index number of the primary secondary cell, and thus it is possible that the cell index number (for example, cell index #1, or the like) that is implicitly designated is also allocated.

The base station device 2 explicitly or implicitly designates the cell index number of the SCG cell, and thus can notify the terminal device 1 of the SCG that is a target for the change of in the configuration of the SCG cell or for the deletion (release) of the configuration the SCG cell. The instruction for the addition, the change, and the deletion of the configuration of the SCG cell for the terminal device 1 is notified using the RRC message.

In a case where the primary secondary cell of the terminal device 1 is released, if an SCG cell other than the primary secondary cell is configured as the secondary cell for the terminal device 1, the base station device 2 may notify the release with both of the cell index number of the primary secondary cell of the terminal device 1 and a cell index number of the SCG cell other than the primary secondary cell being included, and may notify the release with only the cell index number of the primary secondary cell of the terminal device 1 being included.

In a case where information in which the cell index information (a cell index list) indicating one or a plurality of SCG cells that are release targets is configured is received from the base station device 2, the terminal device 1 releases the corresponding configuration of the SCG cell of the terminal device 1. Furthermore, in a case where the cell index information indicating the SCG cell that is the release target corresponds to the primary secondary cell, although an SCG cell other than the primary secondary cell is configured, the terminal device 1 may regard the release of all the SCG cells as being notified.

With this constitution, because it is possible that the terminal device 1 and the base station device 2 gives and takes (exchange or shares) the cell index relating to the secondary cell between the base station device 2-1 and the base station device 2-2, the base station device 2-1 and the base station device 2-2 can adjust the cell index number of the secondary cell, which is allocated to the terminal device 1, and can avoid a problem that the same cell index number is allocated to the same terminal device.

With regard to the MCG cell and the SCG cell during the dual connectivity, the terminal device 1 according to the present invention can perform the power headroom report that uses the notified cell index number. Furthermore, with regard to the MCG cell and the SCG cell during the dual connectivity, the base station device 2 according to the present invention can perform the control of the activation/deactivation that uses the configured cell index number.

According to the first embodiment, the terminal device 1 includes control means that suitably changes a received state of the cell in the cell group in accordance with the MAC control element indicating the activation and/or deactivation of the secondary cell. Because of this, the terminal device 1 can control the state of the cell. Furthermore, the terminal device 1 includes control means that reports a type 1 or type 2 power headroom of each of the cells that correspond to the notified cell index number, respectively, using one MAC control element. Because of this, the terminal device 1 can efficiently report the state of the cell. Furthermore, the terminal device 1 includes control means that configures the radio resource for each of the cells that correspond to the notified cell index numbers, respectively, using the cell index. Because of this, the terminal device 1 can efficiently manage the radio resource configuration of the SCG cell.

Furthermore, the base station device 2 includes control means that avoids redundancy in the cell indexes between the base station device 2 and another base station device 2 by giving and taking (adjusting) the cell index information between the base station device 2 and another base station device 2. Because of this, the base station device 2 can efficiently control the state of the cell.

Second Embodiment

A second embodiment of the present invention will be described below.

According to the first embodiment, the reason why the cell index information on the secondary cell needs to be given and taken (adjusted) between the base station device 2 and another base station device 2 is that, with regard to the report type of the Power Headroom in the related art and the activation/deactivation of the secondary cell, the same cell index is not assumed to be configured. Accordingly, according to the second embodiment, there is provided a control method in which, even in a case where the same cell index number is configured for the terminal devices 1, it is possible to suitably perform control in each of the terminal devices 1.

Because constitutions of the terminal device 1 and the base station device 2 in the second embodiment are the same as those in the first embodiment, descriptions thereof are omitted.

FIG. 8 is a diagram illustrating one example of the allocation of the cell index (the cell index number) that is notified by the base station device 2 to the terminal device 1, according to the second embodiment. Unlike in the first embodiment, there is no need to give and take the cell index information in advance between the base station device 2-1 and the base station device 2-2. As a result, in some cases, redundancy is present in the cell indexes that are configured for the terminal device 1.

For example, for the terminal device 1, the primary cell, secondary cell #1, and secondary cell #2 are configured as cells in the MCG, and secondary cell #3 and secondary cell #4 are configured as cells in the SCG Moreover, secondary cell #3 is a primary secondary cell.

At this time, for the terminal device 1, as cell index numbers, cell index #0 is configured for the primary cell, cell index #1 for secondary cell #1, cell index #2 for secondary cell #2, cell index #3 for secondary cell #1, and cell index #4 for secondary cell #2. Moreover, cell index #0 is allocated to a cell index of the primary cell in a dynamic state.

Moreover, the base station device 2 may not allocate the cell index of the primary secondary cell in a dedicated manner to every terminal device 1, and may allocate cell index number to every terminal device 1 in a dynamic manner. A control method in this case is the same as that in the first embodiment.

In this manner, a method of controlling the master base station device and the secondary base station device using the cell index number in a case where adjustment of the allocation of the cell index number that is configured for the terminal device 1 in advance between the master base station device and the secondary base station device is not performed will be described in detail below.

<PH Report>

FIG. 9 is a diagram for describing a report type of a Power Headroom of the SCG cell that is transmitted from the terminal device 1 to the base station device 2 (the base station device 2-1 and the base station device 2-2), according to the second embodiment. The terminal device 1 may follow the procedure that is illustrated in FIG. 5, at a timing at which the Power Headroom is triggered.

Each line in FIG. 9 corresponds to one octet length (8 bits). In the case where the Power Headroom is triggered, the terminal device 1 arranges (include) the field for the bitmap information that includes the cell index (C(i), i=1, 2, and so forth up to 7) of each of the primary secondary cell and the secondary cell in the SCG, which is to be reported, the field for the type 2 PH of the primary secondary cell, the field for the type 1 PH of the primary secondary cell, and a field for the type 1 PH of the secondary cell in the SCG that is activated, in an order that is illustrated in FIG. 9, generates a MAC control element, transmits the generated MAC control element to the base station device 2, and thus reports the Power Headroom. The terminal device 1 may report the nominal power (which is referred to as Pcmax), as well as reporting the Power Headroom each of the cells.

Moreover, considering that the report of the Power Headroom of the primary secondary cell is at all times included, the terminal device 1 may not configure a bit for the field (C(i)) for the bitmap information on the cell index that corresponds to the primary secondary cell in FIG. 9. That is, the field (C(i)) for the bitmap information on the cell index that corresponds to the primary secondary cell may be configured to be "0". For example, even in the case where cell index #3 is configured for the cell index that corresponds to the primary secondary cell, "0" may be configured for C(3).

Furthermore, for reporting, the terminal device 1 includes a bit in field (C(i)) for the bitmap information on the cell index that corresponds to the primary secondary cell, and includes a report value of the type 1 PH of the primary secondary cell within each of the field for the type 1 PH of the primary secondary cell and the field for the type 1 PH of the secondary cell that is activated.

For example, in the case where the report of the Power Headroom is triggered, if secondary cell #3 (the primary secondary cell or cell index #1) and secondary cell #4 (cell index #2) are activated, in the field for the bitmap information on the cell index in FIG. 9, the terminal device 1 configures "1" as a bit for C(1) and C(2) and configures "0" as a bit for C(3) to C(7). Furthermore, a value of the type 2 PH of cell index #1 is included for the field for the type 2 PH of the primary secondary cell, and a value of the type 1 PH of cell index #1 is included for the field for the type 1 PH of the primary secondary cell.

Then, furthermore, a value of the type 1 PH of cell index #1 and a value of the type 1 PH of cell index #2 are included in this order for the field for the type 1 PH of the secondary cell that is activated. That is, in this case, the type 1 PH of the primary secondary cell is reported in a state of being including two different fields within the same MAC control element.

The terminal device 1 brings together the report type of the Power Headroom of the SCG cell that is illustrated in FIG. 9, and the report type of the Power Headroom of the MCG cell that is illustrated in FIG. 13, for reporting to the base station device 2. That is, in a case where in the communication using the dual connectivity, the Power Headroom is triggered, the terminal device 1 generates both of the MAC control element of the power headroom report on the MCG cell and the MAC control element of the power headroom report on the SCG cell, and positions the two MAC control elements within the MAC PDU for transmission. Moreover, it is desirable that the MAC control elements are consecutively positioned within the MAC PUD.

Furthermore, in a case where in the communication using the dual connectivity, the MAC PDU that is transmitted from the terminal device 1 is received and two MAC control elements of the power headroom report are positioned within the MAC PDU, the base station device 2 regards (determines) both of the MAC control element of the power headroom report on the MCG cell and the MAC control element of the power headroom report on the SCG cell as being positioned, and receives the Power Headroom of each.

In a case where both of the MAC control elements of the cell groups are positioned, because the report type in the related art can be reused, for example, a change in the MAC layer is minimized, but because two MAC headers that correspond to the MAC control elements, respectively, are included in the MAC PDU, as much overhead as the MAC header occurs. Accordingly, the terminal device 1 may report the power headroom report on the MCG cell and the power headroom report on the SCG cell, in a state of being included in one MAC control element.

Figure 10:
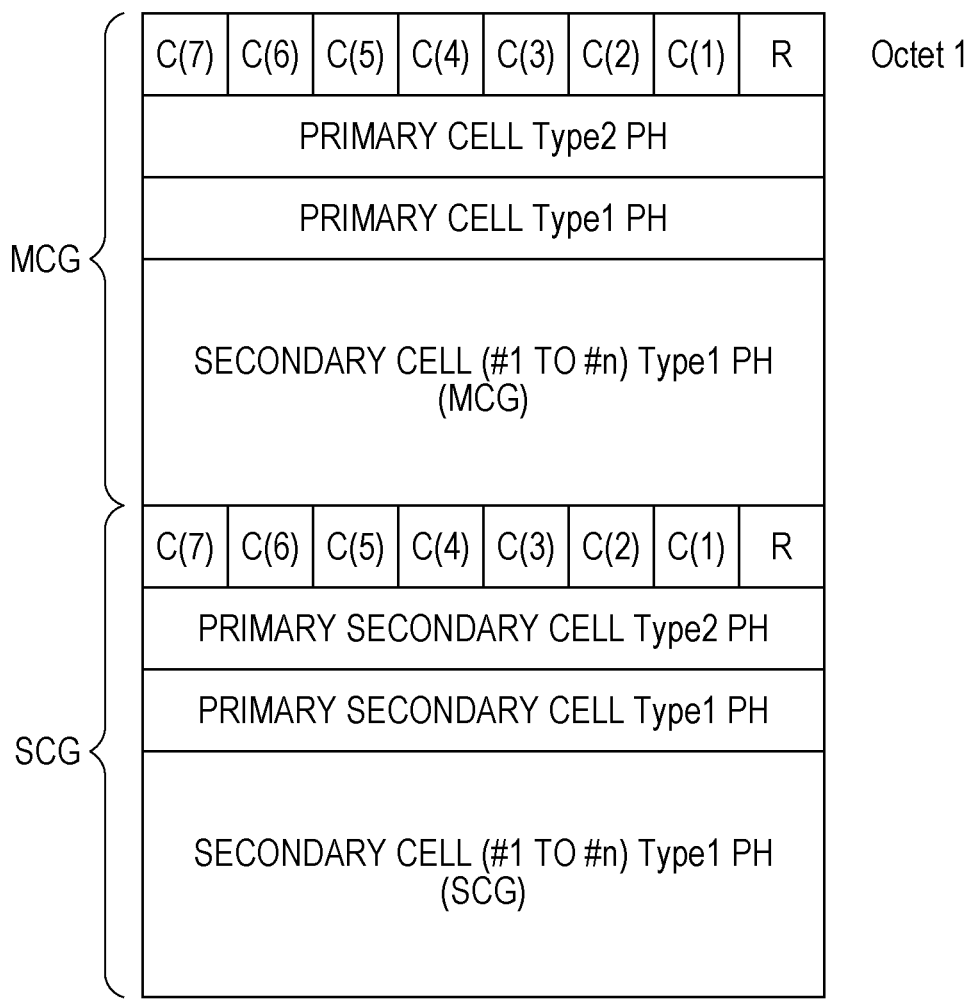
FIG. 10 is a diagram for describing another example of the report type of the Power Headroom according to the second embodiment of the present invention.

FIG. 10 is a diagram for describing a report type in a case where the terminal device 1 includes the power headroom report on the MCG cell and the power headroom report on the SCG cell in one MAC control element.

The power headroom relating to the MCG cell is included in the front half of a field in FIG. 10, and the power headroom report relating to the SCG cell is included in the rear half of the field. Because detained information that is included in each of the field is in accordance with the description that is provide referring to FIGS. 9 and 13, a description thereof is here omitted.

<Activation/Deactivation>

Only a control method that is different from that in the first embodiment is described.

According to the present embodiment, it is possible that the base station device 2-1 and the base station device 2-2 configure the cell index for the terminal device 1 without any adjustment between the base station device 2 and another base station device 2, but because a method of control of the activation/deactivation in the terminal device 1 changes less often, the cell index number of the primary secondary cell may be dynamically allocated.

Specifically, the base station device 2 may dynamically allocate cell index #0, as the cell index number of the primary secondary cell, for the terminal device 1. That is, in the dual connectivity, cell index #0 can be regarded as being reserved in advance for the primary cell and the primary secondary cell.

In this case, the base station device 2 may not explicitly notify the terminal device 1 of the cell index number of the primary secondary cell. The terminal device 1 may regard a MCG cell to which cell index #0 is allocated, as the primary secondary cell, and may accordingly perform control. Furthermore, the terminal device 1 may regard an SCG cell to which cell index #0 is allocated, as the primary secondary cell, and may accordingly perform control.

Then, the terminal device 1 controls a cell state of the secondary cell in the cell group to which the received cell belongs. In other hands, only the cell index that corresponds to the cell group, among the cell indexes that are included in the MAC control element which indicates the activation/deactivation may be considered.

The terminal device 1 and the base station device 2 configure a dynamic number (#0) as the cell index number of the primary secondary cell, and thus there is no need to consider the activation/deactivation of the primary secondary cell using the C(i) field for the cell index that is included in the MAC control element indicating the activation/deactivation. Because of this, control is simplified.

<SCG Cell Radio Resource Configuration>

Only a control method that is different from that in the first embodiment is described.

According to the present embodiment, it is possible that the base station device 2-1 and the base station device 2-2 configure the cell index for the terminal device 1 without any adjustment between the base station devices 2-1 and 2-2, but because a method of control of the radio resource configuration in the terminal device 1 changes less often, the cell index number of the primary secondary cell may be dynamically allocated.

Specifically, the base station device 2 may dynamically allocate cell index #0, as the cell index number of the primary secondary cell, for the terminal device 1. That is, in the dual connectivity, cell index #0 can be regarded as being reserved in advance for the primary cell and the primary secondary cell.

In this case, the base station device 2 may not explicitly notify the terminal device 1 of the cell index number of the primary secondary cell. The terminal device 1 may regard the MCG cell to which cell index #0 is allocated, as the primary secondary cell, and may accordingly perform control. Furthermore, the terminal device 1 may regard an SCG cell to which cell index #0 is allocated, as the primary secondary cell, and may accordingly perform control.

With this constitution, even in a case where the same cell index number is allocated to the same terminal device, it is possible that the terminal device 1 and the base station device 2 suitably perform the power headroom report that uses the cell index from the terminal device 1, and the control of the cell activation/deactivation that uses the cell index for the terminal device 1.

With regard to the MCG cell and the SCG cell during the dual connectivity, the terminal device 1 according to the present invention can perform the power headroom report that uses the notified cell index number. Furthermore, with regard to the MCG cell and the SCG cell during the dual connectivity, the base station device 2 according to the present invention can perform the control of the activation/deactivation that uses the configured cell index number.

According to the second embodiment, the terminal device 1 includes control means that suitably changes a received state of the cell in the cell group in accordance with the MAC control element indicating the activation and/or deactivation of the secondary cell. Because of this, the terminal device 1 can control the state of the cell. Furthermore, the terminal device 1 includes control means that reports the type 1 or type 2 power headroom of each of the cells that correspond to the notified cell index number, respectively, using the MAC control element of every cell group. Because of this, the terminal device 1 can efficiently report the state of the cell. Furthermore, the terminal device 1 includes control means that configures the radio resource for each of the cells that correspond to the notified cell index numbers, respectively, using the cell index. Because of this, the terminal device 1 can efficiently manage the radio resource configuration of the SCG cell.

Furthermore, because there is no need to give and take (adjust) the cell index information in advance between a base station device 2 and another base station device 2, the base station device 2 can efficiently control the state of the cell.

Moreover, the embodiments described above are only simple examples, and can be realized using various modification examples and substitution examples. For example, it is possible that an uplink transmission scheme is also applied to a communication system in compliance with either a frequency division duplex (FDD) scheme or a time division duplex (TDD) scheme. Furthermore, because the name of each parameter that is described according to the embodiments is given for convenience of description, even if the name of the parameter that is applied in practice and the name of the parameter according to the embodiments of the present invention are different from each other, this does not exert any influence on the gist of the invention claimed, in the embodiments of the present invention.

Furthermore, the term "connection" that is used in each embodiment is not limited only to the configuration in which a certain device and another certain device are connected directly to each other using a physical circuit, and includes the meaning of a configuration in which a connection is made logically or of a configuration in which a wireless connection is made using a wireless technology.

Furthermore, the terminal devices 1 include not only a portable or moving mobile station device, but also a stationary-type electronic device that is installed indoors or outdoors, or a non-moving-type electronic device, for example, a cellular phone, a personal computer, a tablet type terminal, AV equipment, kitchen equipment, a cleaning machine, a washing machine, an air conditioner, office equipment, a vending machine, home appliances, a measuring device, a vehicle-mounted device, and all devices that result from building a communication function into a wearable device or a health care device that is capable of be worn on a human body. Furthermore, the terminal device 1 is used not only for human-to-human or human-to-machine communication, but also for machine-to-machine communication (Machine Type Communication) or Device-to-Device Communication (D2D).

The terminal device 1 is also referred to as a user terminal, a mobile station device, a communication terminal, a mobile machine, a terminal, User Equipment (UE), or a Mobile Station (MS). The base station device 2 is also referred to as a wireless base station device, a base station, a wireless base station, a fixed station, a NodeB (NB), an evolved Node B (eNB), a Base Transceiver Station (BTS), or a Base Station (BS).

Moreover, the base station device 2 is referred to as the NB in UMTS that is stipulated by 3GPP, and as the eNB in EUTRA or Advanced EUTRA. Moreover, the terminal device 1 in UMTS that is stipulated by 3GPP, and in EUTRA and Advanced EUTRA is also referred to as the UE.

Furthermore, for convenience of description, the method, the means, and the algorithm step of realizing the functions of, some of the functions, of the units of each of the terminal device 1 and the base station device 2 are described referring to the functional block diagrams of the terminal device 1 and the base station device 2 according to the embodiments, but these can be realized directly by software, a software module that is implemented by a processor, or combinations of these two.

If the method, the means, and the algorithm step are built in hardware, in addition to being constituted as described referring to the block diagrams, the terminal device 1 and the base station device 2 each may be constituted from a power supply device or battery that supplies power to the terminal 1 and the base station device 2, a display device such as a liquid crystal display, a display drive device, a memory, an input and output interface, input and output terminals, a speaker, and other peripheral devices.

If the method, the means, and the algorithm step are built in software, the function can be retained as one or more commands or codes on a computer-readable medium, and can be transmitted. The computer-readable media include both of a communication media or a computer recording media that helps to carry a computer program from one place to another place.

Then, one or more commands or codes may be recorded on the computer-readable recording medium, and a computer system may be caused to read and execute the one or more command or codes that are recorded on the recording medium to perform control of the terminal device 1 or the base station device 2. Moreover, the "computer system" here is defined as including an OS and hardware components such as a peripheral device.

The operations that are described according to each embodiment of the present invention may be realized with a program. A program running on the terminal device 1 and the base station device 2 according to each embodiment of the present invention is a program (a program for causing a computer to operate) that controls a CPU and the like in such a manner as to realize the above-described functions of each embodiment according to each embodiment of the present invention. Then, pieces of information that are handled in the device are temporarily stored in a RAM while being processed. Thereafter, the pieces of information are stored in various ROMs or HDDs, and if need arises, are read by the CPU to be modified or written.

Furthermore, in some cases, the functions of the embodiments described above are realized by executing the program, and in addition, the functions of each embodiment of the present invention are realized by performing processing in conjunction with an operating system or other application programs, based on an instruction from the program.

Furthermore, the "computer-readable recording medium" refers to a portable medium, such as a semiconductor medium (for example, a RAM, a nonvolatile memory card, or the like), an optical recording medium (for example, a DVD, an MO, an MD, a CD, a BD, or the like), and a magnetic recording medium (for example, a magnetic tape, a flexible disk, or the like), and a recording device, such as a disk unit that is built into the computer system. Moreover, the "computer-readable recording media" is defined as including a medium that dynamically retains the program for a short period of time, such as a communication line that is available when transmitting the program over a network such as the Internet or over a communication network such as a telephone network, and a medium that retains the program for a fixed period of time, such as a volatile memory within the computer system, which functions as a server or a client in a case where the program is retained dynamically for a short period of time.

Furthermore, the program described above may be one for realizing some of the functions described above and additionally may be one that can realize the functions described above in combination with a program that is already recorded in the computer system.

Furthermore, functional blocks or all features of each of the terminal device 1 and the base station device 2 according to each embodiment described above can be built into or implemented by a general-purpose processor, a digital signal processor (DSP), an application-specific or general-purpose integrated circuit (ASIC), a field programmable gate-array signal (FPGA) or other programmable logic devices, a discrete gate or a transistor logic, a discrete hardware component, or a combination of these.

The general-purpose processor may be a microprocessor, and instead, the processor may be a conventional processor, a controller, a microcontroller, or a state machine. The general-purpose processor or each circuit described above may be constituted as a digital circuit, be constituted as an analog circuit, and be constituted as a combination of the digital circuit and the analog circuit.

Furthermore, the processor may be built as a combination of computing devices. For example, the processor may be a DSP and a microprocessor, multiple microprocessors, one or more microprocessors that are connected to a DSP core, or a combination of other such constitutions.

The embodiments of the invention are described in detail above based on the specific examples, but it is apparent that the nature of each of the embodiments of the present invention and a scope of claims are not limited to the specific examples. A change in design and the like that fall within the scope that does not depart from the gist of the invention are also included. That is, the description in the present specification serves the purpose of providing an exemplary description, and does not impose any limitation to each embodiment of the present invention.

Furthermore, various modifications are possible within the scope of the present invention defined by claims, and embodiments that are implemented by suitably combining technical means that are disclosed according to different embodiments are also included in the technical scope of the present invention. Furthermore, a configuration in which a constituent element that achieves the same effect is substituted for the one that is described according to each embodiment described above is also included in the technical scope of the present invention.

INDUSTRIAL APPLICABILITY

Several aspects of the present invention can be applied to a terminal device, a base station device, a communication system, a control method, an integrated circuit, and the like, in all of which states of a plurality of cells need to be efficiently controlled.

DESCRIPTION OF REFERENCE NUMERALS

1 TERMINAL DEVICE
2, 2-1, 2-2 BASE STATION DEVICE
101, 201 RECEPTION UNIT
102, 202 DEMODULATION UNIT
103, 203 DECODING MODULE
104, 204 RECEPTION DATA CONTROL UNIT
105, 205 PHYSICAL LAYER CONTROL UNIT
106, 206 TRANSMISSION DATA CONTROL UNIT
107, 207 CODING UNIT
108, 208 MODULATION UNIT
109, 209 TRANSMISSION UNIT
110, 210 RADIO RESOURCE CONTROL UNIT
211 NETWORK SIGNAL TRANSMISSION AND RECEPTION UNIT

The invention claimed is:

1. A terminal device configured to perform communication using a first cell group including a primary cell for a first base station device and a second cell group including a primary secondary cell for a second base station device, the terminal device comprising:
control circuitry; and
transmission circuitry that transmits a first Medium Access Control (MAC) control element; wherein
in a first case where the primary secondary cell is added:
the control circuitry:
determines that a power headroom report is triggered,
calculates a first value of a first type of power headroom information for the primary cell in the primary cell and a second value of a second type of power headroom information for the primary secondary cell in the primary secondary cell, respectively, and
generates a second MAC control element including the first type of power headroom information and the second type of power headroom information of at least the primary cell and the primary secondary cell, and
the transmission circuitry transmits the second MAC control element.

2. The terminal device according to claim 1, wherein in the first case, a Physical Uplink Control Channel (PUCCH) and a Physical Uplink Shared Channel (PUSCH) are transmitted on a same subframe, and the control circuitry calculates the first value of the first type of power headroom information in the primary cell and the second value of the second type of power headroom information in the primary secondary cell, respectively.

3. The terminal device according to claim 1,
wherein, in the first case, cell indexes that correspond to the primary cell and the primary secondary cell are individually configured with an RRC message, and a specific value which indicates a cell that the first type of power headroom information and the second type of power headroom information is reported is configured for a bit for bitmap information that corresponds to the cell indexes.

4. A base station device configured to perform communication using a first cell group including a primary cell for a first base station device and a second cell group including a primary secondary cell for a second base station device, the base station device comprising:

reception circuitry that receives a first Medium Access Control (MAC) control element; wherein
in a first case where the primary secondary cell is added and a power headroom report is triggered:
the reception circuitry receives a second MAC control element,
the second MAC control element includes a first value of a first type of power headroom information for the primary cell and a second value of a second type of power headroom information for the primary secondary cell, the first value and the second value are respectively calculated in the primary cell and in the primary secondary cell.

5. A control method for a terminal device configured to perform communication using
a first cell group including a primary cell for a first base station device and a second cell group including a primary secondary cell for a second base station device, the control method comprising:
transmitting a first Medium Access Control (MAC) control element, wherein
in a first case where the primary secondary cell is added, determining that a power headroom report is triggered, calculating a first value of a first type of power headroom information for the primary cell in the primary cell and a second value of a second type of power headroom information for the primary secondary cell in the primary secondary cell, respectively,
generating a second MAC control element including the first type of power headroom information and the second type of power headroom information, and
transmitting the second MAC control element.

6. The control method according to claim 5, further comprising:
in the first case that, a Physical Uplink Control Channel (PUCCH) and a Physical Uplink Shared Channel (PUSCH) are transmitted on the same subframe,
respectively calculating the first value of the first type of power headroom information in the primary cell and the second value of the second type of power headroom information in the primary secondary cell.

7. The control method according to claim 5, further comprising:
in the first case, individually configuring cell indexes that correspond to the primary cell and the primary secondary cell with an RRC message, and configuring a specific value for a bit for bitmap information that corresponds to the cell indexes, the specific value indicating a cell that the first type of power headroom information and the second type of power headroom information are reported.

8. A control method for a base station device configured to perform communication using a first cell group including a primary cell for a first base station device and a second cell group including a primary secondary cell for a second base station device, the control method comprising:
receiving a first Medium Access Control (MAC) control element, wherein
in a first case where the primary secondary cell is added and a power headroom report is triggered:
receiving a second MAC control element, the second MAC control element includes a first value of a first type of power headroom information for the primary cell and a second value of a second type of power headroom information for the primary secondary cell, the first value and the second value are respectively calculated in the primary cell and the primary secondary cell.

* * * * *